United States Patent
Holbrook et al.

(10) Patent No.: US 10,574,555 B2
(45) Date of Patent: Feb. 25, 2020

(54) NETWORK DATA STREAM TRACER

(71) Applicant: Arista Networks, Inc., Santa Clara, CA (US)

(72) Inventors: Hugh Holbrook, Palo Alto, CA (US); Francois Labonte, Menlo Park, CA (US); Kenneth Duda, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/378,196

(22) Filed: Dec. 14, 2016

(65) Prior Publication Data

US 2017/0222881 A1    Aug. 3, 2017

Related U.S. Application Data

(60) Provisional application No. 62/288,145, filed on Jan. 28, 2016.

(51) Int. Cl.
*H04L 12/26* (2006.01)

(52) U.S. Cl.
CPC ................. *H04L 43/0876* (2013.01)

(58) Field of Classification Search
None
See application file for complete search history.

(56) References Cited

U.S. PATENT DOCUMENTS

| | | | |
|---|---|---|---|
| 6,188,674 B1 * | 2/2001 | Chen | H04L 43/0835 370/252 |
| 7,606,203 B1 * | 10/2009 | Shabtay | H04L 1/08 370/252 |
| 7,924,739 B2 * | 4/2011 | Sen | H04L 43/0835 370/253 |
| 9,596,167 B1 * | 3/2017 | Jacob | H04L 45/745 |
| 9,762,464 B2 * | 9/2017 | Cociglio | H04L 43/0829 |
| 2003/0046388 A1 * | 3/2003 | Milliken | H04L 41/046 709/224 |
| 2005/0281259 A1 * | 12/2005 | Mitchell | H04L 43/026 370/389 |
| 2011/0255440 A1 * | 10/2011 | Cociglio | H04L 43/0835 370/253 |
| 2013/0287017 A1 * | 10/2013 | Chen | H04L 49/253 370/355 |
| 2016/0020993 A1 * | 1/2016 | Wu | H04L 45/14 370/392 |

\* cited by examiner

*Primary Examiner* — Kwang B Yao
*Assistant Examiner* — Juvena W Loo
(74) *Attorney, Agent, or Firm* — Haley Guiliano LLP

(57) ABSTRACT

Various embodiments of a network element comprising a control plane including stream tracer logic are described herein. The network element additionally includes a data plane coupled to the control plane, where the data plane includes forwarding logic to forward a unit of network data from an ingress interface to an egress interface. The stream tracer logic can be configured to cause marking logic to mark selected units of network data for to be counted by counting logic and to cause the counting logic to count marked units of network data. The stream tracer logic can determine whether units of network data are dropped within the forwarding logic via comparison of an ingress count of the marked units of network data with an egress count of the marked units of network data.

38 Claims, 14 Drawing Sheets

NETWORK DATA STREAM TRACER

RELATED APPLICATIONS

Applicant claims the benefit of priority of prior, provisional application Ser. No. 62/288,145, filed Jan. 28, 2016, the entirety of which is hereby incorporated herein by reference.

FIELD OF INVENTION

This invention relates generally to data networking and more particularly to the tracing if network data streams within a network element.

BACKGROUND OF THE INVENTION

A network element (such as a router or switch) transmits and receives network data using one or more ports of that network element. For each incoming unit of network data (e.g., packet, frame, datagram, etc.), the network element makes a forwarding decision, considering user configuration, the contents of the packet, the state of the switch, including "forwarding tables", and negotiated protocol information. The forwarding decision indicates whether the unit of network data is to be dropped or forwarded, and if so, to which port (or ports) the unit of network data is to be forwarded, including if the packet is sent to a central processing unit (CPU) on the control plane of the network element.

A network can drop a unit of network data when the network data should have been forwarded for a number of reasons including software bugs, insufficient internal buffering resources, or incorrect programming of switch state due to software or firmware problems. Additionally incorrect programming can arise due to errors on one or more buses that connect the network element to the controlling software. Furthermore, spontaneous errors in the state used for forwarding data can occur because of, for example, hardware bugs, corruption on internal buses internal to the forwarding hardware, bit flips on account of cosmic rays in forwarding tables or buffers, failing memories or logic caused by manufacturing defects, age, temperature, or physical stress. Additionally, improper mechanical connections between line cards and fabric cards can result in bit errors on the internal connections of the network element.

SUMMARY OF THE DESCRIPTION

To minimize the harmful impact of lost network elements, embodiments described herein provide for a network element having logic to quickly identify when a network element is misforwarding traffic, allowing corrective action can be taken. In one embodiment a network element includes forwarding logic to forward a unit of network data from an ingress interface to an egress interface and stream tracer logic to cause marking logic to mark selected units of network data for counting via counting logic. The stream tracer logic causes the counting logic to count the marked units of network data at an ingress point and an egress point of a detection region within the forwarding logic, the counting logic to generate an ingress count and an egress count for the detection region, wherein the stream tracer logic is to detect whether units of network data are dropped within the detection region via a count of the marked units of network data.

One embodiment provides for a non-transitory machine-readable medium storing instructions which, when executed by one or more processors, cause the one or more processors to perform operations to determining whether network data is dropped within a forwarding pipeline of a network element. In one embodiment the operations comprise causing the forwarding pipeline to label particular units of network data, generating a first count of labeled units of network data that pass a first stage within the forwarding pipeline, generating a second count of labeled units of network data that pass a second stage within the forwarding pipeline, causing the forwarding pipeline to stop labeling the particular units of the network data, retrieving the first and second count of labeled units of network data to pass the first and second stage, and comparing the first count and second count to detect dropped units of network data within the network element.

One embodiment provides for a system for tracing network data streams within a network element. In one embodiment the system comprises a first set of network data ports to receive one or more units of network data, a first set of forwarding engines coupled to the first set of network data ports, a switching fabric to couple the first set of forwarding engines with a second set of forwarding engines, the second set of forwarding engines coupled to a second set of network data ports, and stream tracer logic to trace one or more streams of network data through one or more detection regions positioned between the first set of network data ports and the second set of network data ports to determine whether one or more units of network data are dropped within the network element, the stream tracing logic to determine whether the one or more units of network data are dropped via counting logic positioned between at the ingress and egress of each of the one or more detection regions.

One embodiment provides for a method of determining whether network data is dropped within a forwarding pipeline of a network element, the method comprising labeling particular units of network data within the forwarding pipeline, generating a first count of labeled units of network data that pass a first stage within the forwarding pipeline, generating a second count of labeled units of network data that pass a second stage within the forwarding pipeline, stopping the labeling of the particular units of network data, retrieving the first and second count of labeled units of network data to pass the first and second stage, and comparing the first count and second count to detect dropped units of network data within the network element.

For the various embodiments described, a network element includes any one or more of a router, switch, hub, bridge, gateway, or other infrastructure devices for a packet-forwarding network. A network element can be a physical or virtual device. Additionally, the network data described herein includes various types of network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
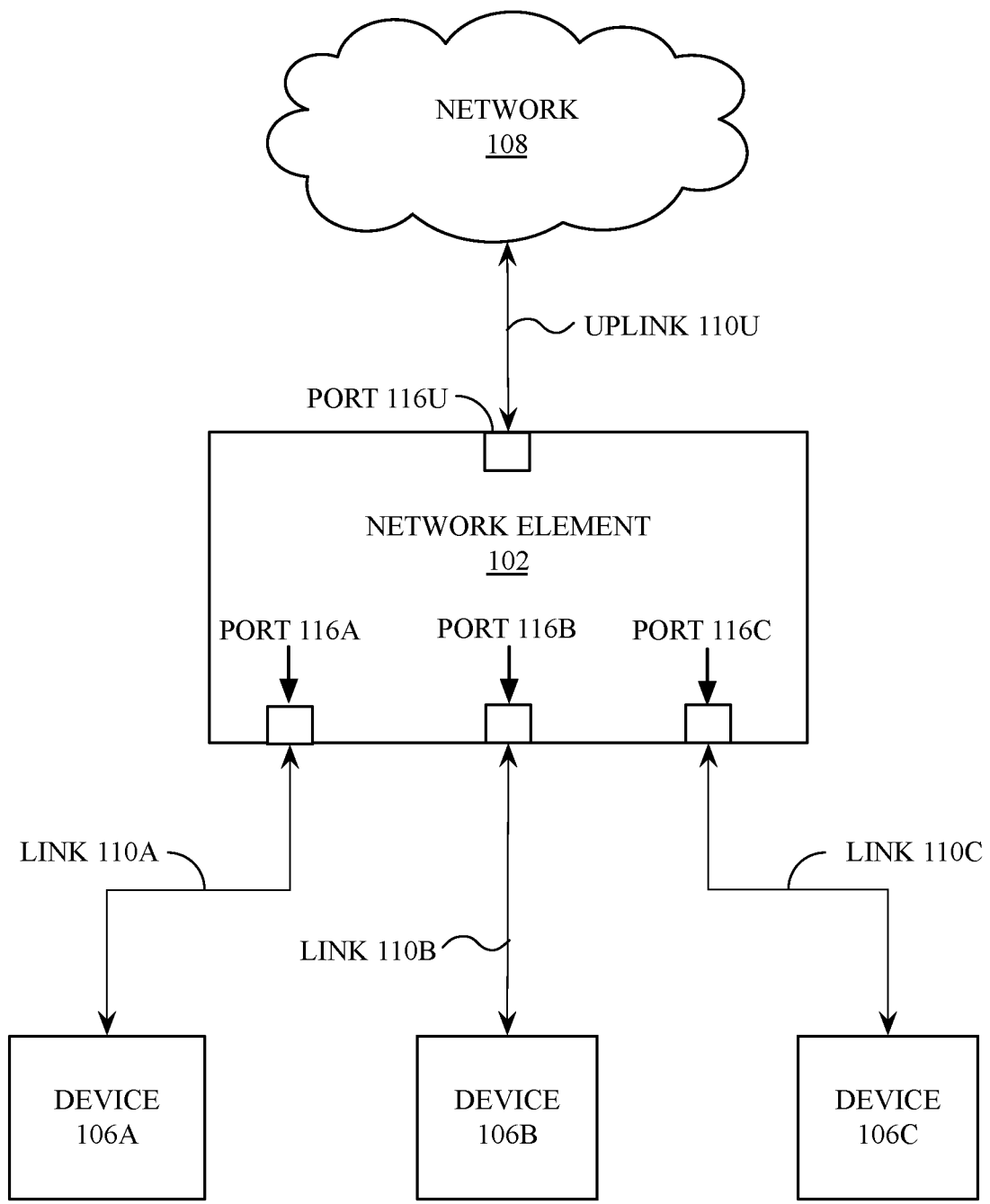
FIG. 1 is a block diagram of one embodiment of a system that includes a network element communicating network data between a network and a number of devices.

In one embodiment, a stream tracer identifies "streams" of network data (e.g., packets, frames, datagrams, etc.) within a network element (e.g., switch, router, bridge, gateway, etc.) and counts any drops in the stream. A simplified version of the stream tracer may be configured to perform "boundary accounting," in which a boundary is defined within a network element and the ingress and egress counters at the boundary are read and compared. The ingress and egress counters can be configured to count all network data interesting and exit the boundary and compare the collective counters.

However, identifying a boundary where the ingress and egress counters are expected to exactly match and that covers enough of the system to catch a large fraction of errors is significantly challenging for several reasons. The ingress or egress boundary may have multiple ingress or egress points. Computing the total number of boundary crossings involves summing a set of multiple counters on each ingress port or network processor on the ingress or egress boundary. In some embodiments it may not be possible to simultaneously snapshot all of the required boundary counters in an atomic manner, which may introduce error into the counter measurements. Additionally, network data may originate inside the boundary. For example, the control plane central processing unit (CPU) can originate packets that cross the egress boundary without having crossed the ingress boundary. Additionally, the control plane CPU may be the destination of an incoming unit of network data. Furthermore, multicast or layer 2 virtual local area network (VLAN) flooded data may cause network data unit replication within the boundary. The degree of replication may vary depending on the multicast or VLAN group membership to which the network data is flooded.

In embodiments described herein, an optimized stream tracer improves on boundary accounting to eliminate the sources of error present in boundary accounting implementations. Using the stream tracer techniques described, a network element can reliably detect dropped units of network data within the internal switching fabric. In various embodiments, stream tracer logic detects dropped network data by performing operations including enabling the marking of packets, frames, datagrams, or other units of network data within the ingress pipeline. Marked network data is counted at a defined ingress boundary. Marked network data is also counted at a defined egress boundary. Marking can then be disabled after a period of time. By disabling the marking of network data, the counting of network data is disabled.

A stream may be identified by periodically marking units of network data that will be forwarded by the network element in such a way that the mark is carried with the unit of network data from ingress to egress within the network element. The network element then counts all such marked units of network data on both ingress and egress. Any discrepancy between marked and counted units of network data can be detected using this mechanism. In one embodiment, the stream tracer uses standard, production network traffic that regularly flows through the network element without requiring any special probe or test data.

In one embodiment, the stream tracer is implemented within a network element having a single forwarding engine. In one embodiment, the stream tracer is implemented within a network element having a multiple forwarding engines and/or a distributed switching fabric. The stream tracing can be performed on a per-forwarding engine basis, or can be performed at specifically defined ingress or egress boundaries within a network element.

In one embodiment, the network element enables a counter at ingress and egress points of each forwarding engine pipeline. Initially these ingress and egress counters may be initialized to zero. The counters can then be configured to count all units of network data that have been marked at a mark stage. Marking logic can be configured to mark or label particular units of network data based on network data characteristics associated with the particular units of network data. Next, marking and/or labeling of the data can be enabled for a period of time. After the period of time, the marking and/or labeling can be disabled. Once marking and/or labeling is disabled, the stream tracer performs a delay that is sufficiently long enough to ensure that marked data has had sufficient time to reach the egress counting stage. After the delay, the ingress and egress counters are read. Any discrepancy in which the ingress counter is larger than the egress counter may indicate that at least some network data has been lost within the forwarding logic. The duration of marking may be a long duration or a relatively shorter duration. In one embodiment, the marking logic is configured to ensure that a sufficiently long quiescent period occurs after marking is disabled.

In various embodiments, the mark and the marking may be implemented in multiple ways based on the architecture of the forwarding engine. In embodiments providing forwarding engines having a highly flexible architecture, it is possible to associate arbitrary data with a unit of network data at the marking stage that is then carried through the forwarding engine pipeline. That associated data may then be used to trigger counting on ingress and egress.

One embodiment provides for a stream tracer implementation that repurposes one or more network data unit marking mechanism that was initially designed for another purpose. For example, a drop precedence marking mechanism may be used. In this approach the mark stage is applied to set a drop precedence value on marked units of network data. The forwarding stage may then be configured such that the drop precedence does not influence any forwarding decisions made by the forwarding engine(s) of the network element.

In one embodiment, not all units of network data are marked. For example, it may be difficult in some network processor architectures used in some network elements to account for multicast network data as, in some implementations, multicast network data units may be replicated internally, such that one unit of network data at "in" counter may spawn multiple replicas of the network data at the "out" counter. In such architecture, it may be advantageous to avoid marking multicast packets. However, not all embodiments have this limitation.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network element 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. Variability in latency generally occurs in a network element due to the processing time involved in buffering, queuing, processing and forwarding network data from a source port to a destination port in that network element.

Figure 2:
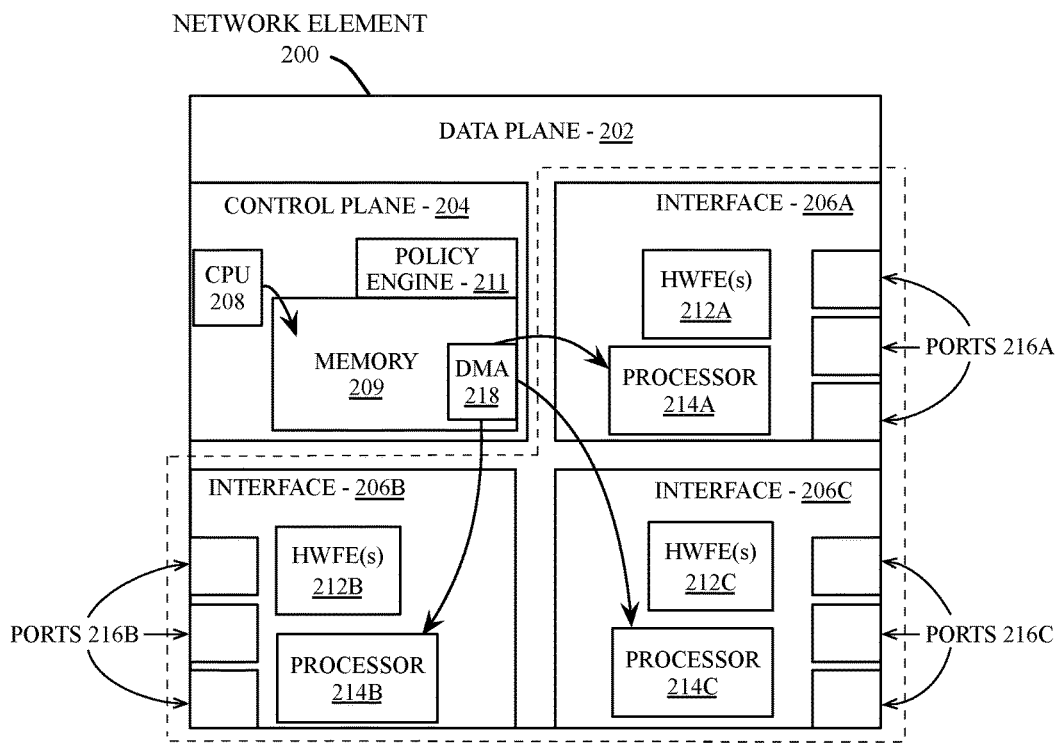
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and to write configuration data for hardware forwarding engines 212A-C in the network interface devices 206A-C. Additionally, the CPU 208 can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C include multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processors 214A-C, and ports 216A-C, respectively. Each hardware forwarding engine 212A-C forwards data for the network element 200, such as performing routing, switching, or other types of network forwarding. Each of the processors 214A-C can be used to accelerate various functions of the interface devices 206A-C, such as programming a corresponding hardware forwarding engine 212A-C or pushing data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipelines

In various embodiments, network elements include various forwarding engine pipeline configurations. In one embodiment, a network element contains a single forwarding engine pipelines. In one embodiment, a network element can contain multiple forwarding engine pipelines.

Figure 3:
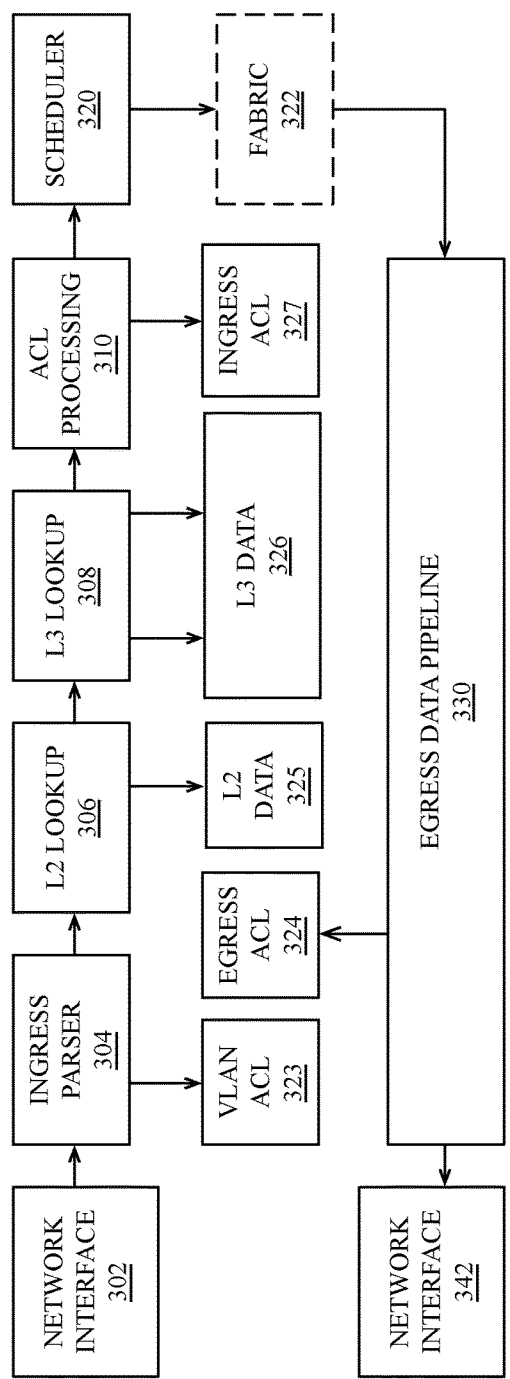
FIG. 3 is a block diagram of a forwarding pipeline for a network element, according to an embodiment.

FIG. 3 is a block diagram of a forwarding pipeline 300 within one embodiment of a network element. In one embodiment, the forwarding pipeline 300 resides in a hardware forwarding engine (e.g., HWFE 312), which includes logic from one or more of the HWFE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320.

Access control lists in the form of a VLAN ACL 323, Ingress ACL 327, and Egress ACL 324 allow policy and filtering actions to be performed on network data at multiple stages within the forwarding pipeline 300. L2 data 325 and L3 data 326 store various tables used to perform data-link layer (layer 2) and network layer (layer 3) forwarding by the forwarding pipeline 300. In one embodiment, after processing and forwarding operations are performed by ingress elements of the forwarding pipeline, the scheduler 320 forwards ingress network data to a fabric module 322, which provides data-plane connectivity between multiple packet processors in the network element. In one embodiment a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342.

In one embodiment, forwarding operations for a unit of network data proceeds as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, the ingress parser 304 can perform a further comparison for the unit of network data against any configured Port ACLs by performing a lookup in the VLAN ACL 323. If the unit of network matches a DENY statement the unit will be dropped. If the unit of network data matches a PERMIT statement, or no port ACL is applied, then the unit of network data is passed to the next block of the pipeline. Successive stages include L2 lookup 306 and an L3 lookup 308 stages. The L2 lookup 306 stage will reference L2 data 325, which may be a MAC address table, which is an exact-match table. The L3 lookup 308 will reference L3 data 326, which includes an exact-match table that contains/32 IPv4 and/128 IPv6 host routes, and a longest-prefix match (LPM) table that contains IPv4 and IPv6 routes that are not host routes.

Figure 4:
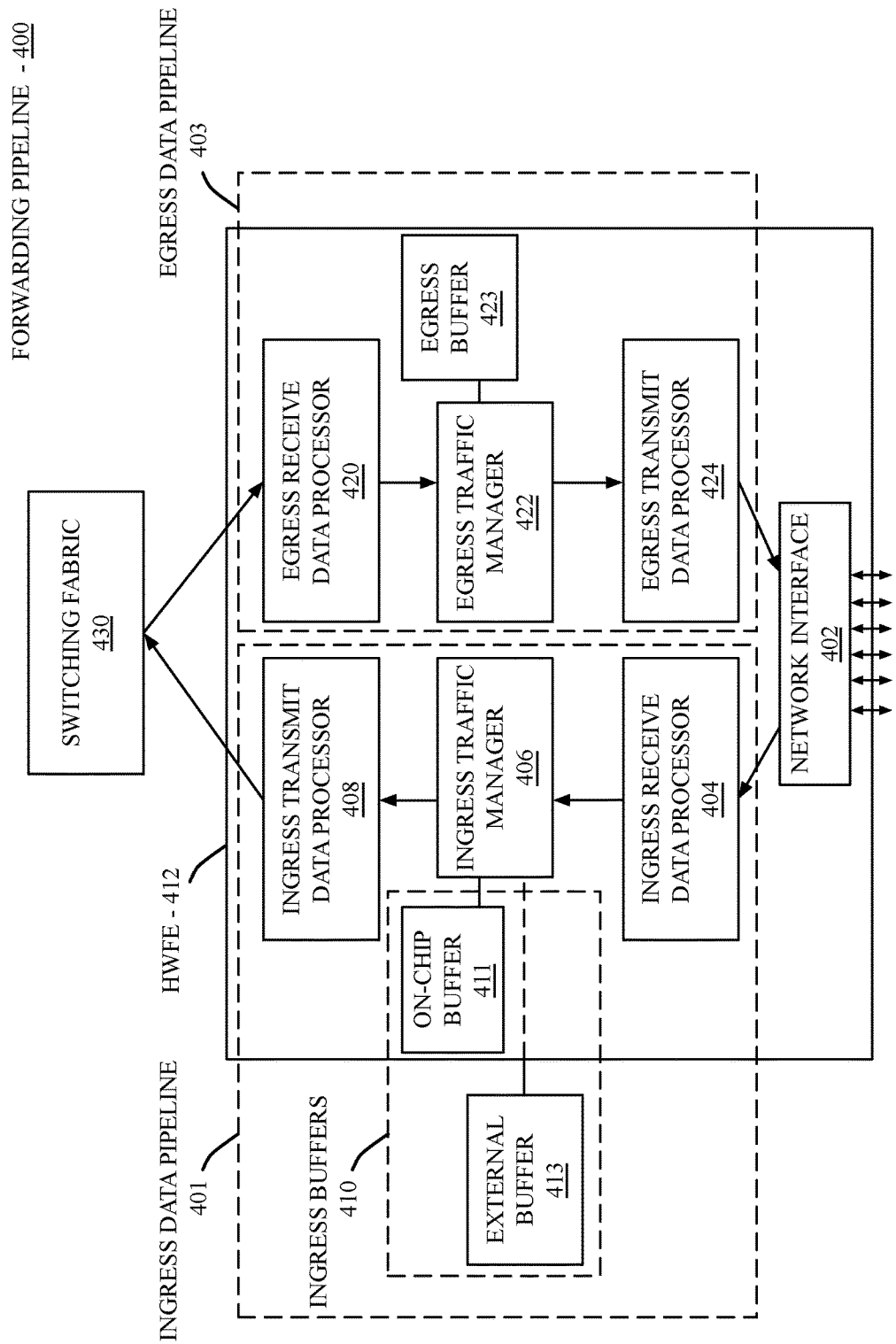
FIG. 4 is a block diagram of an additional forwarding pipeline for a network element, according to an embodiment.

FIG. 4 is a block diagram of an alternate forwarding pipeline 400 within one embodiment of a network element. In one embodiment, the forwarding pipeline 400 resides in a hardware forwarding engine (e.g., HWFE 412), which includes logic from one or more of the HWFE(s) 212 within each interface 206 shown in FIG. 2. In one embodiment, within the HWFE 412 resides an ingress data pipeline 401 including a network interface 402, an ingress receive data processor 404, an ingress traffic manager 406, and/or an ingress transmit data processor 408. The ingress data pipeline 401 can include ingress buffers 410, which in one embodiment can include an on-chip buffer 411 that resides in on-chip memory of the HWFE 412. Additionally, an external buffer 413 may also be included. The external buffer 413 can reside in an array of high speed, low latency random access memory (RAM) coupled to the HWFE 412 via a memory bus, which in one embodiment is a multi-channel memory bus.

In one embodiment, the ingress data pipeline 401 of the HWFE 412 works in concert with an egress data pipeline 403 residing within the HWFE 412. The egress data pipeline 403 can include an egress receive data processor 420, an egress traffic manager 422, on chip memory storing an egress buffer 423, and and/or an egress transmit data processor 424, which couples to the network interface. In one embodiment, the ingress data pipeline 401 and the egress data pipeline 403 each couple with a switching fabric 430, which can include one or more crossbar switches that interconnect multiple interfaces (e.g., interface 206A-C as in FIG. 2).

In one embodiment, the network interface 402 includes a physical layer (e.g., layer 1) interface including one or more ports (e.g., ports 216 as in FIG. 2). The physical layer is responsible for transmission and reception of bit streams across physical connections including encoding, multiplexing, synchronization, clock recovery and serialization of the data on the wire for whatever speed or type of interface is configured. In one embodiment, the network interface 402 supports combinations of 100 gigabits per second, 40 gigabits per second, and/or 10 gigabits per second ports, and ports may be combined into link aggregation groups using, for example, static link aggregation or link aggregation control protocol (LACP). In one embodiment, optical (e.g., fiber optic) and electrical (e.g., copper) connections are supported.

In one embodiment, the network interface 402 additionally includes data-link layer (e.g., layer 2) logic including media access control (MAC) and/or logical link control (LLC) logic. When a valid data stream is received at the physical layer, the data can be passed on to the MAC portion of the data link layer. In one embodiment, the physical and data-link layer logic is in compliance with the IEEE 802.3 Ethernet standard, although other technologies may be supported. In embodiments supporting the Ethernet standard, the MAC portion may divide the incoming data stream into Ethernet frames, although the techniques described herein may apply to equivalent network data units of other protocols and standards.

While the forwarding pipeline 400 is illustrating with specific individual logic elements within the ingress data pipeline 401 and egress data pipeline 403 of the HWFE 412, one having ordinary skill in the art will recognize that equivalent functionality may generally be performed by other logic elements within the forwarding pipeline 400 for network data within a hardware forwarding engine of a network element.

The network interface 402 can couple with the ingress receive data processor 404, which includes forwarding logic for incoming network data. In one embodiment, the ingress receive data processor 404 logic is flexible and can be configured to support new protocols and forwarding methods as they become available. The ingress receive data processor 404, in one embodiment, can parse the headers of incoming network data units and extract fields used to make forwarding decisions, such as data-link layer source and destination addresses (e.g., MAC addresses), VLAN headers, or network layer (e.g., layer 3) source and destination addresses and/or port numbers. In one embodiment, the ingress receive data processor 404 can perform forwarding at the data-link layer or network layer based on address information in the network data unit headers.

For example, a network data unit having a destination MAC address corresponding to the MAC address of the ingress network interface (e.g., network interface 402) may be forwarded using the network layer header address information for the layer 3 protocol (e.g., Internet Protocol, etc.) in use by the network data. Otherwise, a network data unit having a destination MAC address that differs from the address of the ingress network interface may be forwarded to an egress port associated with the indicated destination MAC address. For data-link layer forwarding, the destination MAC address for a given ingress unit of network data can be referenced against a lookup table that is populated with MAC addresses discovered or configured within the data-link layer sub-network of the ingress network data. The unit of network data may then be forwarded to the port associated with the indicated destination MAC address. If the destination MAC address lookup fails, the unit of network data may be flooded to all ports within the indicated data-link layer sub-network.

In one embodiment, the forwarding logic within the ingress receive data processor 404 may also perform a table lookup based on the source data-link layer or network-layer address. For example, the forwarding logic can add an entry for the source MAC address of a unit of network data receive from the network interface 402 if the source MAC address does not exist in the forwarding table. Where unicast reverse path forwarding (uRPF) is enabled for the network layer forwarding logic, a lookup can be performed to determine if the unit of network data has network layer source address information that is known to be valid for the ingress interface. In the case of invalid source address information, the unit of network data may be dropped, for example, to mitigate address spoofing that is commonly used in denial of service attacks on a network.

In one embodiment, VLANs are supported when performing data-link layer forwarding. When VLANs are in use, data-link layer domains may be partitioned to create multiple distinct broadcast domains that mutually isolated. In one embodiment, network data units associated with a specific VLAN can be tagged such that multiple devices may operate within the same virtual sub-network broadcast domain even though those devices are physically connected to different sub-networks. Alternatively, multiple virtual private LANs may be configured to operate on the same physical data-link layer, such that broadcast traffic is isolated within each virtual private LAN. For VLAN data-link layer forwarding, the destination MAC address for a given ingress unit of network data can be referenced against a lookup table that is populated with MAC addresses discovered or configured within the indicated VLAN of the ingress network data. Should the lookup fail, the network data may be flooded to all ports within the VLAN, subject to any storm-control thresholds that may be configured in some embodiments.

In one embodiment, network layer forwarding is performed in a similar manner as data-link layer forwarding, and may be performed using at least one common lookup table, excepting that network layer address data, rather than data-link address data, is used to make forwarding decisions. In one embodiment, for network layer and data-link layer forwarding, multiple different types of lookup tables can be used, with a best match from the combined lookups providing the forwarding result. In one embodiment, equal cost multi-path (ECMP) for network layer forwarding and/or link aggregation data-link layer forwarding is supported. When ECMP or link aggregation is in use, the forwarding determination may resolve to group of ports, providing multiple next-hop entries to choose from. In such embodiment, load-balancing logic may be performed to determine the destination port in the group to forward the network data unit. While logic for unicast forwarding is described above, in one embodiment, multicast forwarding can be performed in a similar manner as when performing ECMP or link aggregation, excepting that the data unit is broadcast to multiple ports in a group of ports. In one embodiment, this may be performed by having the forwarding destination resolve to a multicast ID that provides an index into a table that indicates the output interfaces for a given multicast stream.

In one embodiment the HWFE 412 supports virtual routing and forwarding (VRF). In such embodiment, a VRF instance can be applied to internal data processing headers. When using VRF, multiple instances of a network-layer forwarding table (e.g., routing table) can co-exist within the same network-element to create multiple virtual network-layer forwarding instances. For example, the same or overlapping network layer addresses can be used within the same network element if the conflicting or overlapping addresses are used in separate VRF instances, allowing network paths to be segmented without the use of multiple devices.

In one embodiment, the ingress data pipeline 401 includes logic for an ingress traffic manager 406 that is responsible for the queuing and scheduling of network data after data-link layer or network layer forwarding decisions have been made. The ingress traffic manager 406 can queue incoming units of network data within virtual output queues (VOQs) stored in ingress buffers 410. In one embodiment the ingress buffers include an on-chip buffer 411 stored in on-die or on-package memory of the HWFE, as well as at least one external buffer 413 stored in external (e.g., chipset) memory that is coupled to the HWFE 412. In one embodiment, each HWFE 412 includes a VOQ for each output port in the system. In one embodiment, the VOQs may be split between the on-chip buffer 411 and the external buffer 413, where units that are to be forwarded to uncongested output ports can be stored in the on chip buffer 411, while units destined for congested ports can be stored in the external buffer 413. However, embodiments are not limited to this configuration, as VOQs may be stored entirely in the on-chip buffer 411 or entirely in the external buffer 413 depending on system configuration.

In one embodiment, when a forwarding decision is made for a unit of network data, the ingress traffic manager 406 determines an appropriate VOQ to buffer the unit of network data until logic in the appropriate egress data pipeline (e.g., egress data pipeline 403, or an egress data pipeline in a different hardware forwarding engine) is ready to receive the unit of network data. In one embodiment, the appropriate VOQ for the unit of network data can be determined at least in part based on the destination port to which the unit of network data is to be forwarded, as at least one VOQ exists for each egress port.

In some embodiments the HWFE 412 supports multiple traffic classes for use in implementing Quality of Service (QoS) policies, or other policy based forwarding techniques. In one embodiment, up to 8 distinct traffic classes may be configured and separate VOQs are provided for each traffic class. Per traffic class VOQs may be implemented for both per-input port VOQs as well as per forwarding engine VOQs, such that the number of traffic classes multiplies the total number of VOQs. For example and in one embodiment, the number of per-input port VOQs per HWFE 412 is defined by the number of input ports on the forwarding engine having per-input port VOQs multiplied times the total number of enabled output ports on the system, which in turn is multiplied times the number of traffic classes per port. The number of VOQs available to service input ports below the input-port VOQ threshold is defined for each forwarding engine, in one embodiment, as the total number of enabled output ports on the system multiplied times the total number of traffic classes per port, as units of network data that ingress on each input port having a data rate below the per-input port VOQ threshold may be buffered in a set of per-forwarding engine VOQs.

In one embodiment, once the unit of network data is buffered in a VOQ, the ingress data pipeline 401, for example, via the ingress traffic manager 406, can request a scheduling credit from the forwarding engine that manages the destination port for the unit of network data. Once a scheduling credit is granted, the ingress data pipeline, for example, via an ingress transmit data processor 408, can forward the unit of network data across a switching fabric 430 to the destination forwarding engine. In one embodiment, the switching fabric 430 is a distributed forwarding fabric having multiple available paths between each of the forwarding engines. In such embodiment, the ingress transmit data processor 408 can subdivide the data unit into variable sized cells and transmit the cells across all available crossbar elements within the switching fabric 430. For network data units having an ingress port and an egress port on the same forwarding engine (e.g., HWFE 412), the unit of network data may be locally switched to the egress data pipeline 403 without transmitting data via the switching fabric 430.

In one embodiment, the egress data pipeline 403 of the HWFE 412 processes units of network data after the network data is forwarded. In one embodiment, locally forwarded network data, as well as network data received via the switching fabric 430 is processed by the egress receive data processor 420, which re-assembles network data that is sliced by the ingress transmit data processor 408 with in the ingress data pipeline 401 of the ingress forwarding engine.

In one embodiment, the egress traffic manager 422 is responsible for granting VOQ scheduling credits to ingress traffic managers (e.g., ingress traffic manager 406). The egress traffic manager 422 can immediately grant scheduling requests made for uncongested output ports (e.g., output ports having empty or nearly empty queues in the egress buffer 423) and can grant credits for congested ports using, for example, within a traffic class, using a weighted round robin scheduler that grants fair bandwidth to each requesting VOQ within the ingress data pipeline 401 of the requesting forwarding engine. In one embodiment, the scheduling algorithm is configured to grant requests between traffic classes using the configured egress shaping and scheduling for the port. In one embodiment, the scheduling algorithm is configured to grant requests within a traffic class for an output port among the different VOQs competing for credits based on a weighted round robin scheduler.

In one embodiment, the egress traffic manager 422 also manages egress buffering within the system via the egress buffer 423. In one embodiment, the egress buffer 423 is an on-chip buffer stored in on-die or on-package memory within the HWFE 412. In some configurations, the egress buffer 423 is primarily used for multicast traffic, as unicast traffic may be buffered primarily within the various VOQs. In one embodiment, transmission of network data is managed via the egress transmit data processor 424, which can read buffered egress network data from the egress buffer 423 and transmit the network data via a port on the network interface 402.

Stream Tracing Architecture

Figure 5:
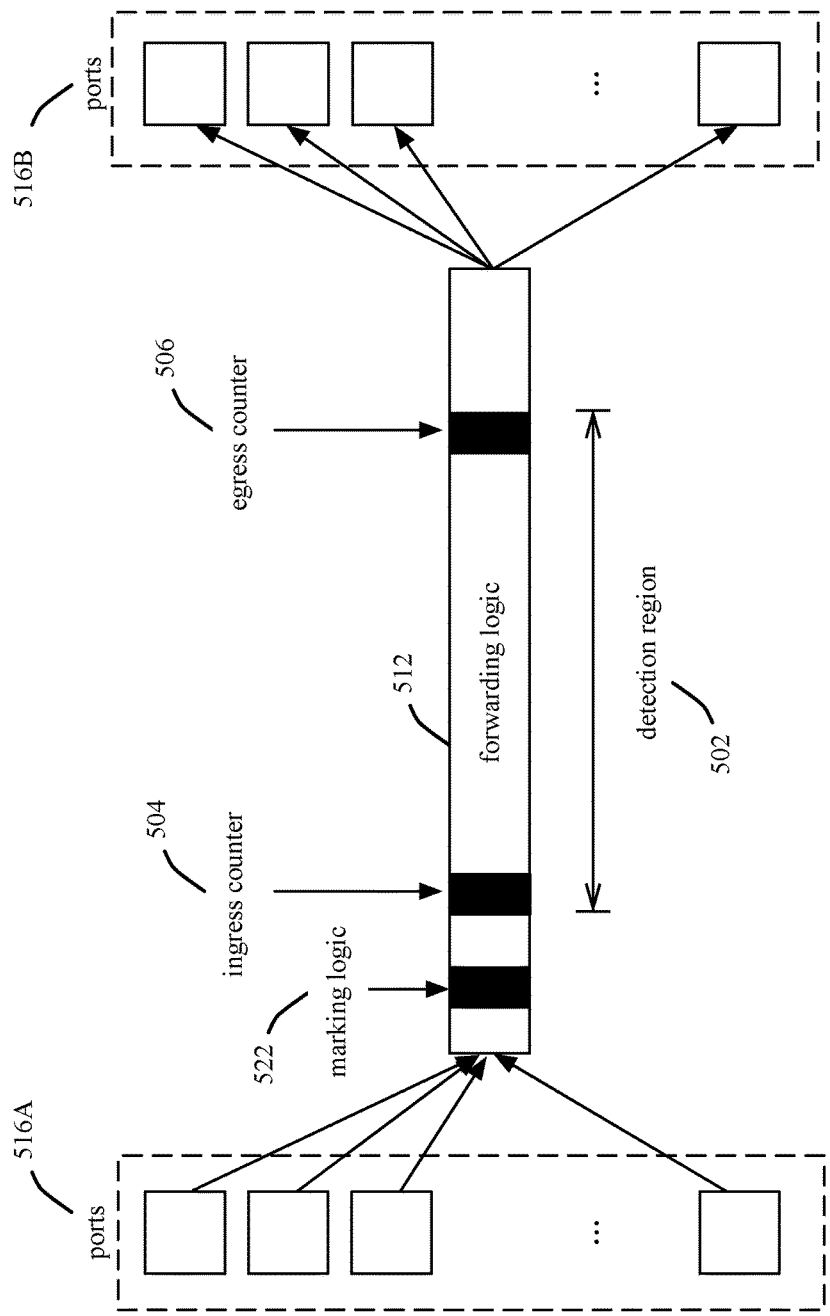
FIG. 5 is a block diagram of forwarding pipeline stream tracing within a forwarding engine of a network element, according to an embodiment.

FIG. 5 is a block diagram of forwarding pipeline stream tracing 500 within a forwarding engine of a network element, according to an embodiment. Forwarding pipeline stream tracing 500 may be performed within forwarding logic 512 of a network element. The forwarding logic 512 illustrated may represent forwarding logic included within the forwarding pipeline 300 of FIG. 3 or forwarding logic included within the forwarding pipeline 400 of FIG. 4. The forwarding logic 512 can couple with a network interface including multiple ports 516A-B, where ports 516A are illustrated as ingress ports for network data and ports 516B are illustrated as egress ports. Ingress and egress ports are indicated relative to the travel path of a given unit of network data through the forwarding logic, and one skilled in the art will recognize that each port may both transmit and receive network data, and the forwarding logic may be configured such that network data may be forwarded from any port in the network element to any other port in the network element, based on the forwarding tables configured for the forwarding logic 512.

In one embodiment, an ingress counter 504 and an egress counter 506 are configured at ingress and egress of the forwarding logic 512. The counters can be configured to count all units of network data that has been marked by marking logic 522 positioned within the forwarding logic 512. The marking logic 522 can be configured to mark selected header regions for network data entering the forwarding logic 512. The portion of the forwarding logic 512 between the ingress counter 504 and the egress counter 506 defines a detection region 502, which is the region of dropped or lost network data detected by the stream tracer. In one embodiment, the ingress and egress counters are initialized to zero, and may be cleared or re-initialized periodically. After the counters are cleared or initialized, marking can be enabled for a period of time. The duration of marking can vary and may be long or short in duration.

The manner and mechanism by which the stream tracer logic marks units of network can vary amongst embodiments and may be user configurable. In one embodiment, the marking may be performed using an entry on an ingress ACL of the forwarding pipeline to direct the marking logic 522 to mark specific units of network data for counting. In one embodiment, the marking logic 522 can mark reserved or unused header within the selected network data unit is modified in a non-intrusive manner. In one embodiment, a field within a protocol header of the network data can be marked to indicate to the ingress counter 504 and the egress counter 506 that the marked units of network data are to be counted. In general, the marking mechanism used by the network element can vary based on the flexibility of the architecture of the network processors and forwarding engines used within the network element. In a forwarding engine having a highly flexible architecture, it is possible to configure customized marking logic 522 to associate arbitrary data at an arbitrary position with a header of a unit of network data. The arbitrary data is then carried with the network data through the forwarding engine pipeline. The arbitrary data associated with the network element may then be used to trigger counting on ingress and egress of the forwarding logic 512 (e.g., by the ingress counter 504 and the egress counter 506). In one embodiment the marking is removed prior to exiting the network element through an egress port. However, some embodiments may be configured to leave the network data unit markings in place, at least while the network data units are within a specific region or sub-region of a defined network.

In one embodiment, the marking logic 522 is implemented by re-purposing one or more existing network data marking mechanisms within the forwarding logic 512. For example, some embodiments can use markings provided by QoS marking logic. QoS logic in the network element, in some embodiments, includes logic to apply a QoS priority mark to the headers of certain units of network data. During periods of congestion, the QoS priority markings may be used by the network element to ensure that high priority network data is forwarded before lower priority network data. In instances of severe congestion, the QoS priority markings may also be used to determine which units of network data to drop, while preventing the forwarding logic 512 from dropping high priority units of network data.

For example, one embodiment includes a drop precedence setting that may be applied to units of network data, such that units of network data with high drop precedence are dropped first, while units of network data with lower drop precedence are dropped last. In one embodiment, one or more of the drop precedence values may be repurposed to indicate to the counter logic that the unit of network data is to be counted. In such embodiment, the forwarding logic 512 may be configured such that the re-purposed drop precedence does not influence forwarding decisions made for the marked unit of network data, such that the drop probability of marked units of network data is not influenced by the re-purposed drop precedence marking or any other re-purposed QoS markings.

In some embodiments, not all network data through the forwarding logic 512 is marked during a marking period. For example, it may be difficult in some forwarding engine architectures to account for multicast network data because multicast data may be replicated internally, such that a single unit of network data at the ingress counter 504 may spawn multiple replicas that will cross the may cross the egress counter 506 counter. In such architecture it may be advantageous to avoid marking multicast packets.

Network data may be lost for various reasons in various portions of the forwarding logic 512. In order to maximize the amount of forwarding logic 512 that is covered by the stream tracer, it may be desirable to mark and count as close as possible to the ingress and egress points of the system (e.g., ports 516A-B). In some embodiments, marking logic 522 may be added to the ports 516A-B, such that certain units of network data are marked immediately at ingress and optionally unmarked at egress. Such marked network data may be counted at the immediate ingress and ultimate egress points of the forwarding logic 512.

However, in some embodiments, marking and counting network data before a forwarding decision has been made for the network data by the forwarding logic 512 can introduce false positive drops for units of network data that are legitimately dropped. This may complicate stream tracer logic where the logic is intended to detect only improper drops. Network data may be legitimately dropped for several reasons. For example, network data matching a DENY entry in an ACL of the forwarding pipeline will be legitimately dropped. Network data may also be dropped based on entries in the forwarding table used by the forwarding logic 512, including, for example, where uRPF is enabled.

After marking has been enabled for a period, the marking may be disabled. Once marking is disabled, the stream tracer logic waits a quiescent period after marking is disabled. The quiescent period lasts a sufficient period of time to ensure that each marked packet is able to reach the egress counting stage. After the quiescent period the ingress and egress counters are read by the stream tracer logic. Any discrepancy in which the ingress counter is larger than the egress counter may indicate that one or more units of network data have been lost within the forwarding logic. While the stream tracer logic may be configured to detect any internal network data drops, the stream tracer is generally configured to detect improper pipeline drops caused by, for example, buffer overruns, programming errors in the forwarding table that may cause network data to be erroneously dropped, or corruption of internal memories due to bugs and parity errors.

Figure 6:
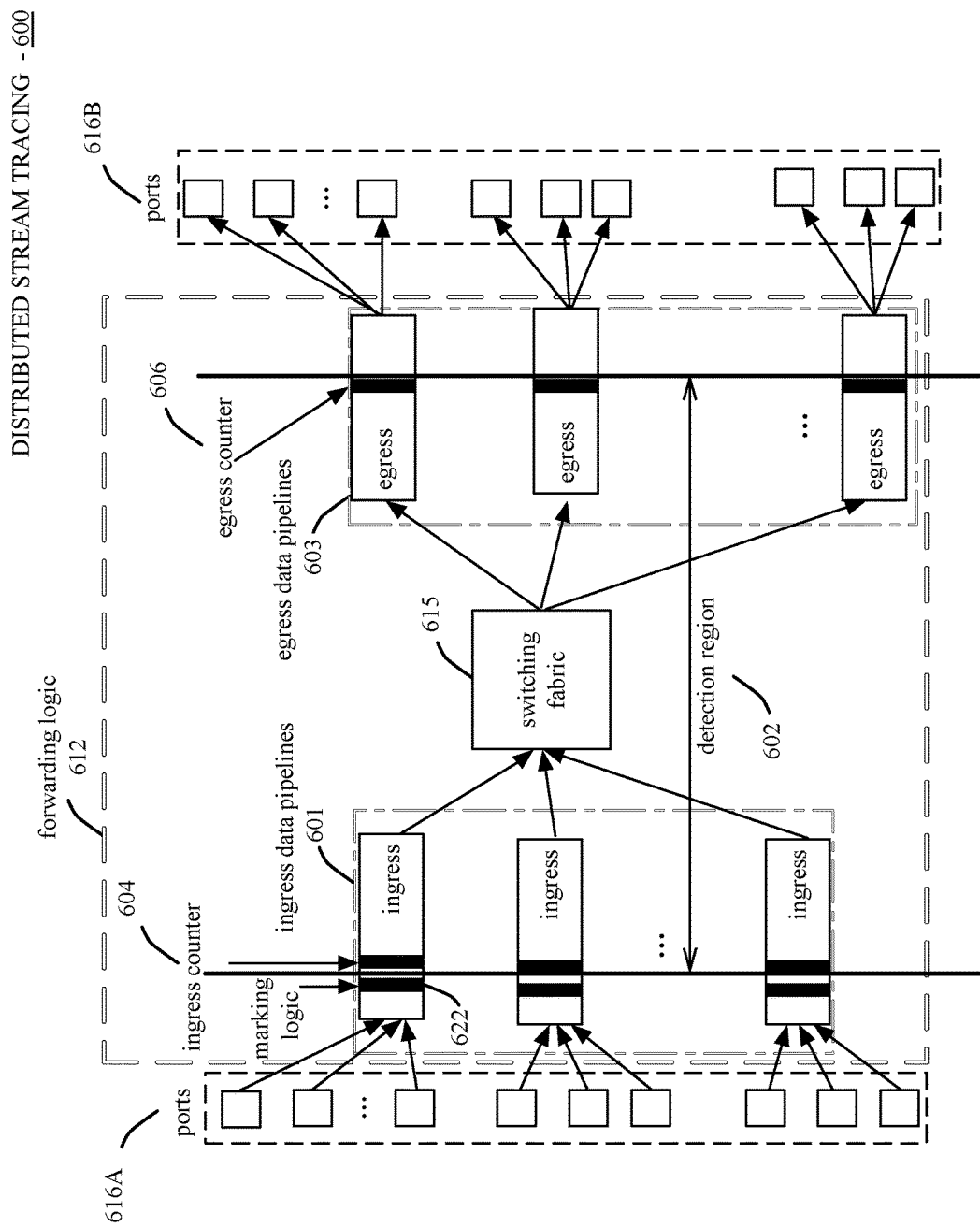
FIG. 6 is a block diagram of architecture for distributed stream tracing, according to an embodiment.

FIG. 6 is a block diagram of architecture for distributed stream tracing 600, according to an embodiment. In one embodiment, distributed stream tracing 600 is implemented in a distributed network element including forwarding logic 612 having multiple forwarding engines (e.g., ingress data pipelines 601, egress data pipelines 603) connected by a switching fabric 615. The switching fabric 615 may take many forms, including a crossbar switch, Clos network, Butterfly network, or a bus network. The same stream tracer architecture may apply to each form of the switching fabric 615.

In one embodiment, the forwarding logic 612 can be a distributed forwarding logic having multiple ingress data pipelines 601 and egress data pipelines 603. Each ingress data pipeline 601 and egress data pipeline 603 may reside in a separate forwarding engine. Each ingress data pipeline includes forwarding logic to make forwarding decisions for incoming network data and places the network data into one or more queues. The network data is then read from the one or more queues and forwarded over the switching fabric 615 to the proper egress engine(s) within one of the egress data pipelines 603. The egress data pipelines 603 include logic to perform additional processing on the network data before the network data is sent to the appropriate port (e.g., within the set of egress ports 616B). In some cases an egress forwarding engine of the egress data pipelines 603 may further influence the forwarding decision made by the ingress forwarding engine of the ingress data pipelines 601 that forwarded the network data. For instance, the egress forwarding engine may determine to drop network data before forwarding the network data to an egress port, for example, because of spanning tree state. Alternatively, network data may be sent to the control plane CPU instead of through an egress port.

In one embodiment, the stream tracer performs distributed stream tracing 600 by configuring marking logic 622 in all ingress engines of the ingress data pipelines 601 to apply a counter mark to incoming network data. An ingress counter 604 and egress counter 606 in each of the ingress data pipelines 601 and egress data pipelines 603 are configured to count marked packets. The ingress counter 604 and egress counter 606 in all ingress data pipelines 601 and egress data pipelines 603 within the forwarding logic 612 are zeroed before the marking is enabled on any engine. Marking is first enabled for a period and then disabled for a period on all forwarding engines within the forwarding logic 612. Ingress and egress counters will be incremented for each unit of network data that is forwarded during the marking period. A quiescent period occurs after marking is disabled to allow marked data to pass the forwarding logic and exit one of the egress ports 616B. The quiescent period is then allowed to pass, and then all ingress and egress counters are retrieved. The stream tracer can detect any unit of network data that is dropped within the detection region 602.

In one embodiment the stream tracer can localize problems to a specific ingress forwarding engine of the ingress data pipelines 601 or the ingress engine connection to the switching fabric 615 by selectively marking packets in the illustrated distributed forwarding logic 612. By enabling marking on only one of the ingress engines of the ingress data pipelines 601 at a time, the stream tracer can localize the stream tracing to a specific ingress engine. In one embodiment, marking is done after the ingress forwarding decision is made to localize the detection of potential forwarding problems to a particular egress engine of the egress data pipelines 603 or to the egress engine connection to the switching fabric 615. In such embodiment, the stream tracer may direct the marking logic 622 to mark only network data destined to a specific egress engine at a time. In one embodiment stream tracing is generally applied for all unicast network data. However, in one embodiment selective marking may be applied for specific traffic classes or QoS priorities to limit stream tracing to high priority data.

In some embodiments distributed stream tracing 600 can also be configured to count at varying and selected portions of the ingress data pipelines 601 and egress data pipelines to localize drop detection to specific components. The counting of data at the selected portions can be spatially and/or temporally overlapping, such that multiple counts may be taken at multiple positions within the various ingress data pipelines 601 and/or egress data pipelines 603, or multiple marks may be placed on network data during a temporally overlapping period. For example, during or in place of general marking to detect potential drops within the entire detection region 602, an additional or different mark may be placed, for example, between the ingress ports 616A and the switching fabric 615 to perform localized tracing on the ingress portion of the forwarding logic. Subsequently or simultaneously, an additional or different mark may be placed to specifically monitor the switching fabric 615 or one or more portions of the egress data pipelines 603. This marking may be performed by multiple instances of the marking logic 622, or a single instance of the marking logic 622 can mark network data with multiple different marks that direct different counters throughout the forwarding logic 612 to count specific units of network data.

Figure 7A:
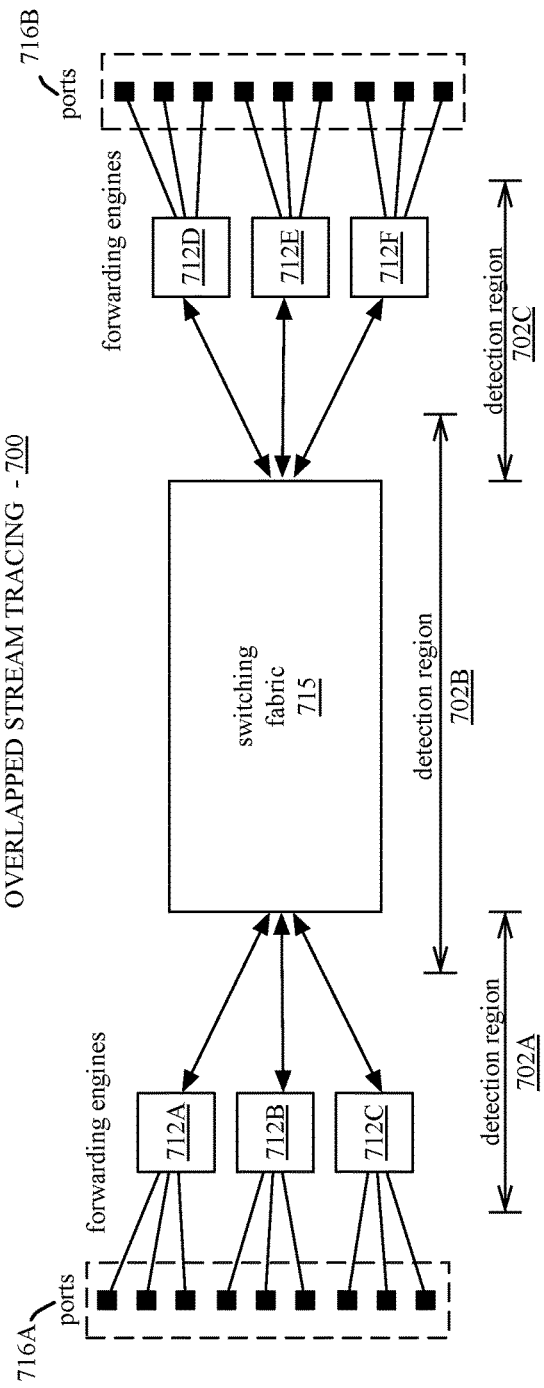
FIGS. 7A-B are block diagrams illustrating architectures for overlapped stream tracing, according to an embodiment.
Figure 7B:
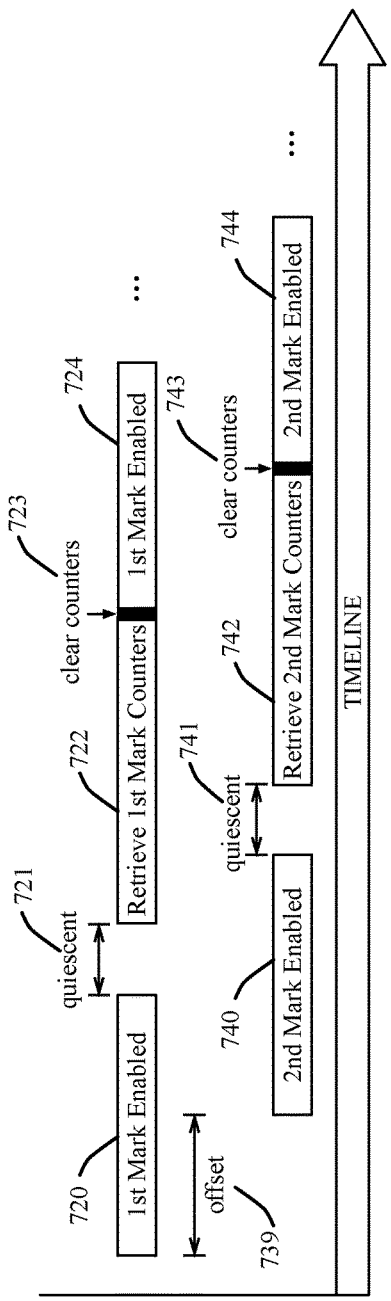

FIGS. 7A-B are block diagrams illustrating architectures for overlapped stream tracing 700, according to an embodiment. In some embodiments, overlapped stream tracing 700 can be performed with spatially overlapping detection regions 702A-C across different areas of the forwarding logic of a network element, as shown in FIG. 7A. In some embodiments, overlapped stream tracing 700 can be performed with multiple, temporally overlapping detection periods, as shown in FIG. 7B. In some embodiments, overlapped stream tracing 700 can be performed in both a spatially and temporally overlapped manner.

As shown in FIG. 7A, multiple spatially overlapping drop detection regions 702A-C can be defined to trace network streams that traverse differing areas of the forwarding pipeline of a network element. A first detection region 702A can be defined to monitor a first group of forwarding engines 712A-C, to enable the detection of dropped network data between the switching fabric 715 and the a first set of ports 716A that are serviced by the first set of forwarding engines 712A-C. A second detection region 702B can be defined to enable the detection of dropped network data within the switching fabric 715. A third detection region 702C can be defined to monitor a second group of forwarding engines 712D-F, to enable the detection of dropped network data between the switching fabric 715 and the a second set of ports 716B that are serviced by the second set of forwarding engines 712D-F. The detection regions shown are exemplary and are not limited to those illustrated. Other detection regions may be defined. In one embodiment multiple detection regions can be defined by using different marks that trigger counters in different regions of the forwarding logic. In one embodiment, multiple detection regions can be defined using marking logic that is distributed throughout the forwarding logic.

As shown in FIG. 7B, multiple temporally overlapping drop detection regions can be defined using two or more different marks. In one embodiment, a first mark is enabled 720 during a first marking period. After a period in which the first mark is enabled 720, the first mark is disabled during a quiescent period 721 to allow marked data to traverse the monitored forwarding pipeline(s). After the quiescent period 721, the stream tracer logic can retrieve data from the first mark counters 722 and compare the counters to determine if a drop has occurred during the monitored period and/or report the raw counter data to a higher control level for analysis. In one embodiment, after the stream tracer logic retrieves the first mark counters 722, the stream tracer logic can clear the counters 723 associated with the first mark and re-enable the first mark 724.

In conjunction with the operations associated with the first mark, the stream tracer logic can enable 740 a second mark. In one embodiment the stream tracer logic enables 740 the second mark after an offset period 739. The operations can proceed in a similar manner as with the first mark. After the period in which the second mark is enabled 740, the second mark is disabled during a quiescent period 741 to allow marked data to traverse the monitored forwarding pipeline(s). After the quiescent period 741, the stream tracer logic can retrieve data from the second mark counters 742 and compare the counters to determine if a drop has occurred during the monitored period and/or report the raw counter data to a higher control level for analysis. In one embodiment, after the stream tracer logic retrieves data from the second mark counters 742, the stream tracer logic can clear the counters 743 associated with the second mark and re-enable the second mark 744. In one embodiment, additional temporally overlapping marks may be used. However, continuous stream tracing may be performed using two marks in the manner illustrated in FIG. 7B.

Stream Tracer Marking and Counting Logic

Figure 8:
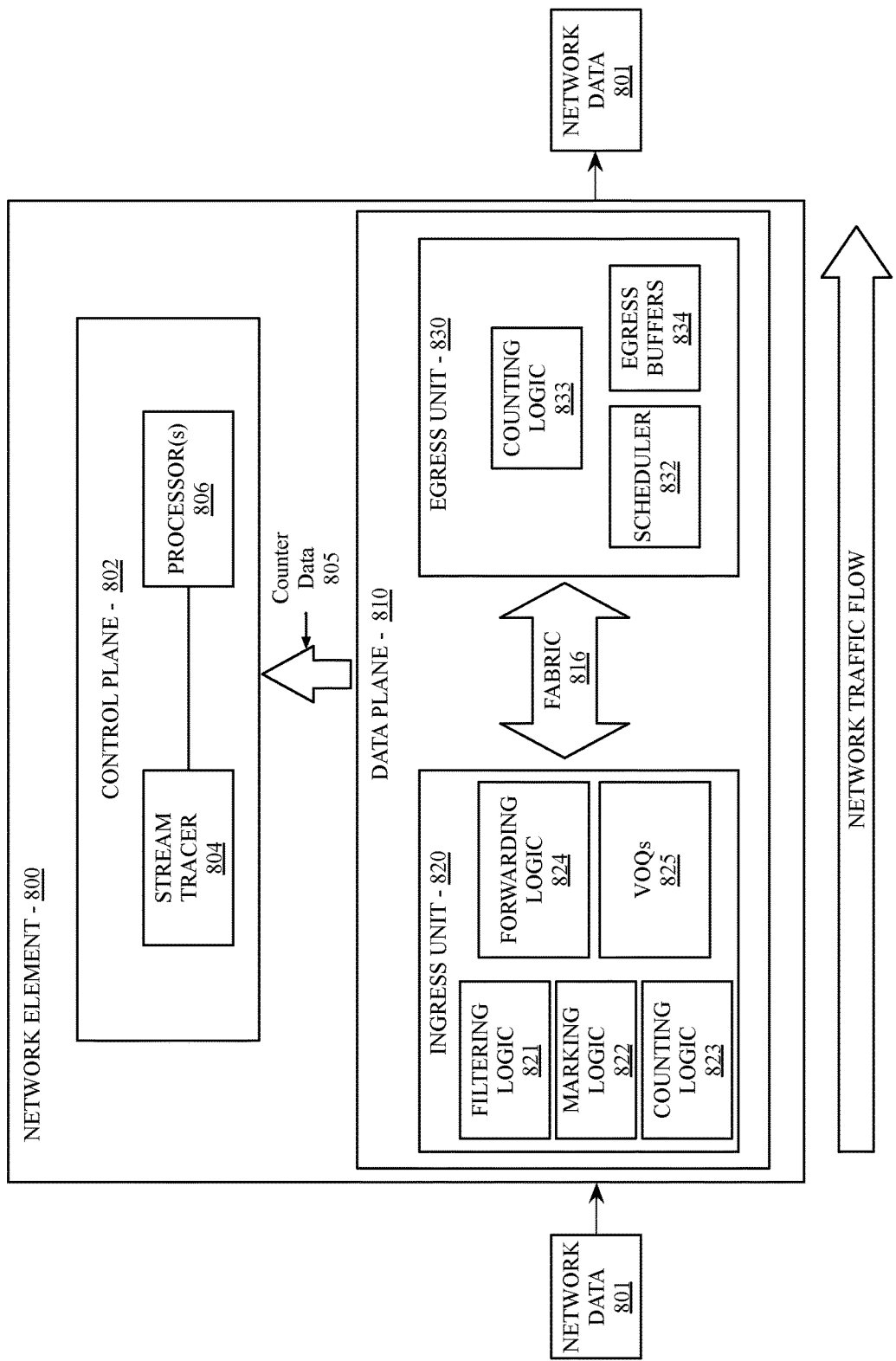
FIG. 8 illustrates a network element having stream tracer marking and counting logic, according to an embodiment.

FIG. 8 illustrates a network element 800 having stream tracer marking and counting logic, according to an embodiment. In such embodiment, the network element 800 includes a data plane 810 coupled to a control plane 802. In one embodiment, the control plane includes one or more processor(s) 806 configured to execute software agents to perform at least a portion of the control plane operations. For example and in one embodiment, the stream tracer 804 is a software agent of the control plane 802 and executes at least in part on the one or more processor(s) 806. In one embodiment the processor(s) 806 are dedicated to control plane operations, which can include managing element of the data plane 810.

The data plane 810 includes one or more hardware forwarding engines (e.g., HWFE(s) 206A-C of FIG. 2). Each forwarding engine can include one or more of an ingress unit 820 and an egress unit 830. The ingress unit 820 and the egress unit 830 can include logic to perform equivalent operations as those illustrated and described with respect to the forwarding pipeline 300 of FIG. 3 or the forwarding pipeline 400 of FIG. 4, including forwarding logic 824, VOQs 825, a scheduler 832, and egress buffers 834. The ingress unit 820 can process and forward network data 801 and forward the network data 801 over a switching fabric 816. The ingress unit 820 includes various network interfaces and ports (not shown) to receive and process various data headers on units of incoming network data 801 and filtering logic 821 to process incoming data according to access control list entries.

In one embodiment the filtering logic 821 can direct marking logic 822 to mark selected units of incoming network data 801. The filtering logic 821 can resolve issues, for example, with multicast and CPU generated and/or destined network data 801 by directing the marking logic 822 to mark only network data 801 for which it is known beforehand that the network element 800, if functioning properly, will forward to a single destination. In some networks the network data 801 to mark can be identified based on a destination IP destination address. The network data 801 that is marked by the marking logic 822 can be counted by counting logic 823 of the ingress unit and counted once again by counting logic 833 in the egress unit 830. Counter data 805 from the counting logic 823, 833 may then be sent to the stream tracer 804 for analysis.

In one embodiment, a ternary content addressable memory (TCAM) filter can be applied by the filtering logic 821. In one embodiment, the TCAM filter can be configured to mark only unicast network data that will traverse the network element, such as data arriving from and destined to a network data port of the network element 800. The TCAM filtering can simplify stream tracing by eliminating the accounting of network data destined to and originating from the control plane processor(s) 806, as well as eliminating the accounting of multicast and flooded data, which complicate the stream tracer implementations used for boundary accounting. While the filtering logic 821 is shown in the ingress unit 820, in one embodiment, the filtering logic 821 can reside between the interface ports (not shown) for the network data and the ingress unit 820. In one embodiment, a variant of the filtering logic 821 can reside within one or more of the interface ports.

In some embodiments, system wide marking can be enabled in the network element 800 using a variant of distributed stream tracing 600 as in FIG. 6, and/or overlapped stream tracing 700 as in FIGS. 7A-B. In such embodiments, the stream tracer 804 can be operated with multiple, selective, and/or overlapping detection region that may begin and/or end before a forwarding decision is made for a unit of network data 801 by the forwarding logic 824, after a forwarding decision has been made for the unit of network data, before or after data is transferred over a switching fabric 816, before or after data is received at the egress buffers 834, and before or after data is de-queued egress buffers 834 and transmitted via an egress port. The system wide and/or overlapping marking can detect dropped or lost data within various elements of the data plane 810, including off-chip memory in external DRAM and on-chip buffers (e.g., external buffer 413 and on-chip buffer 411 as in FIG. 4), the VOQs 825, the scheduler 832, as well as within the switching fabric 816, including any cellularization and reassembly that may occur in distributed variants of the switching fabric 816.

In one embodiment, some portions of the forwarding pipeline followed by network data 801 through the data plane 810 may not covered by the system wide marking described herein. Such portions may include the ingress path between the ingress network interface and the TCAM stage within the filtering logic 821. Other portions may include the egress path between the egress buffers 834 and the egress network interface. Any portions of the data plane 810 that are not covered by the defined detection region of the stream tracer 804 can be protected using other mechanisms, such as boundary accounting stream tracing using hardware counters within each port of the network element 800.

Figure 9:
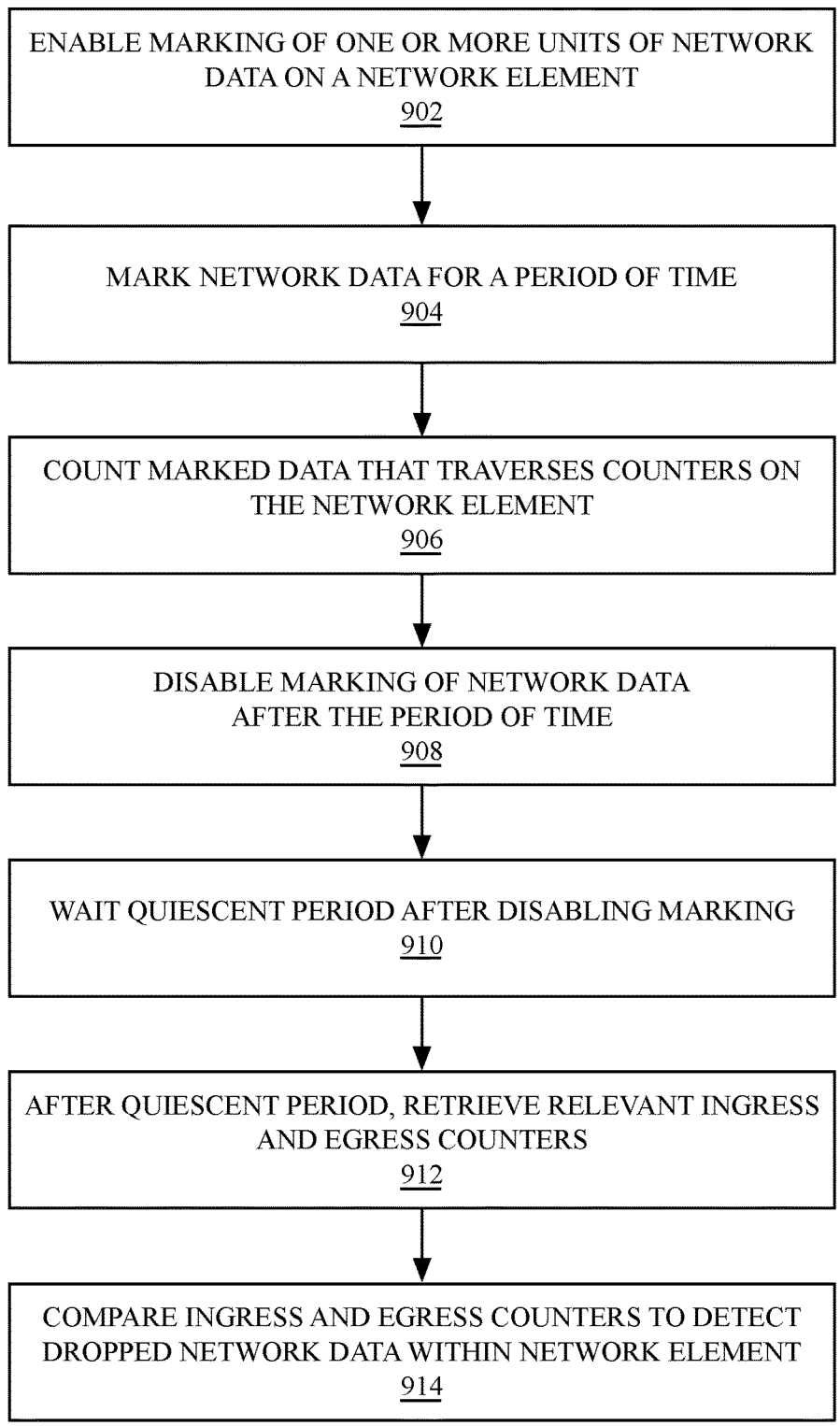
FIG. 9 is a flow diagram of an overview of general stream tracer logic, according to an embodiment.

FIG. 9 is a flow diagram of an overview of general stream tracer logic 900, according to an embodiment. In one embodiment, the stream tracer logic 900 resides at least in part within a stream tracer agent executing on a control plane processor (e.g., stream tracer 804 and processor(s) 806 as in FIG. 8), although stream tracer logic may reside in other regions of a network element. The stream tracer logic 900 can be configured to cause marking logic to enable marking of one or more units of network data on a network element, as shown at block 902. The marking logic can be configured to label or otherwise mark network data for a period of time (e.g., a marking period), as shown at block 904. The stream tracer logic 900 can also configure counting logic (e.g., ingress counters and egress counters) of the network element to count marked data that passes the pipeline stages associated with counters on the network element, as shown at block 906. The stream tracer logic 900 may then cause the marking logic to disable the marking of network data after the period of time (e.g., the marking period), as shown at block 908. After disabling the marking of network data, the stream tracer logic 900 can be configured to wait a quiescent period after disabling the marking, as shown at block 910. The quiescent period allows all marked data to traverse the queues, buffers, filters, forwarding logic, and other data plane components that process the units of network data before an egress counter can count the network data. After the quiescent period, as shown at block 912, the stream tracer logic 900 can retrieve the relevant ingress and egress counters from the counting logic.

The relevant counters can vary among embodiments. In one embodiment, all ingress counters and egress counters are relevant and all counters in a network element are retrieved. In one embodiment, in stream tracer logic 900 can also perform boundary accounting, in which hardware counters on each port of the network unit are retrieved. In one embodiment, selective and/or overlapping stream tracing is performed in which network data streams through certain components of certain forwarding pipelines are traced in a sequential or overlapping manner. Once the relevant ingress and egress counters are retrieved at block 912, the stream tracer logic 900 can compare the ingress and egress counters to detect dropped network data within the network element, as shown at block 914. In one embodiment, the stream tracer logic can also report the counter data to a higher control level for additional analysis. In some embodiments, any discrepancy between the ingress count and the egress count indicates that one or more units of network data have been dropped within the network element. In one embodiment, this discrepancy is compared against expected drops, such as network data destined for the control plane. In one embodiment, expected drops are not counted, as network data that is known to result in a dropped unit of network data is filtered (e.g., not marked) by the marking logic and marking is enabled only on network data that is expected to traverse the network unit.

Figure 10:
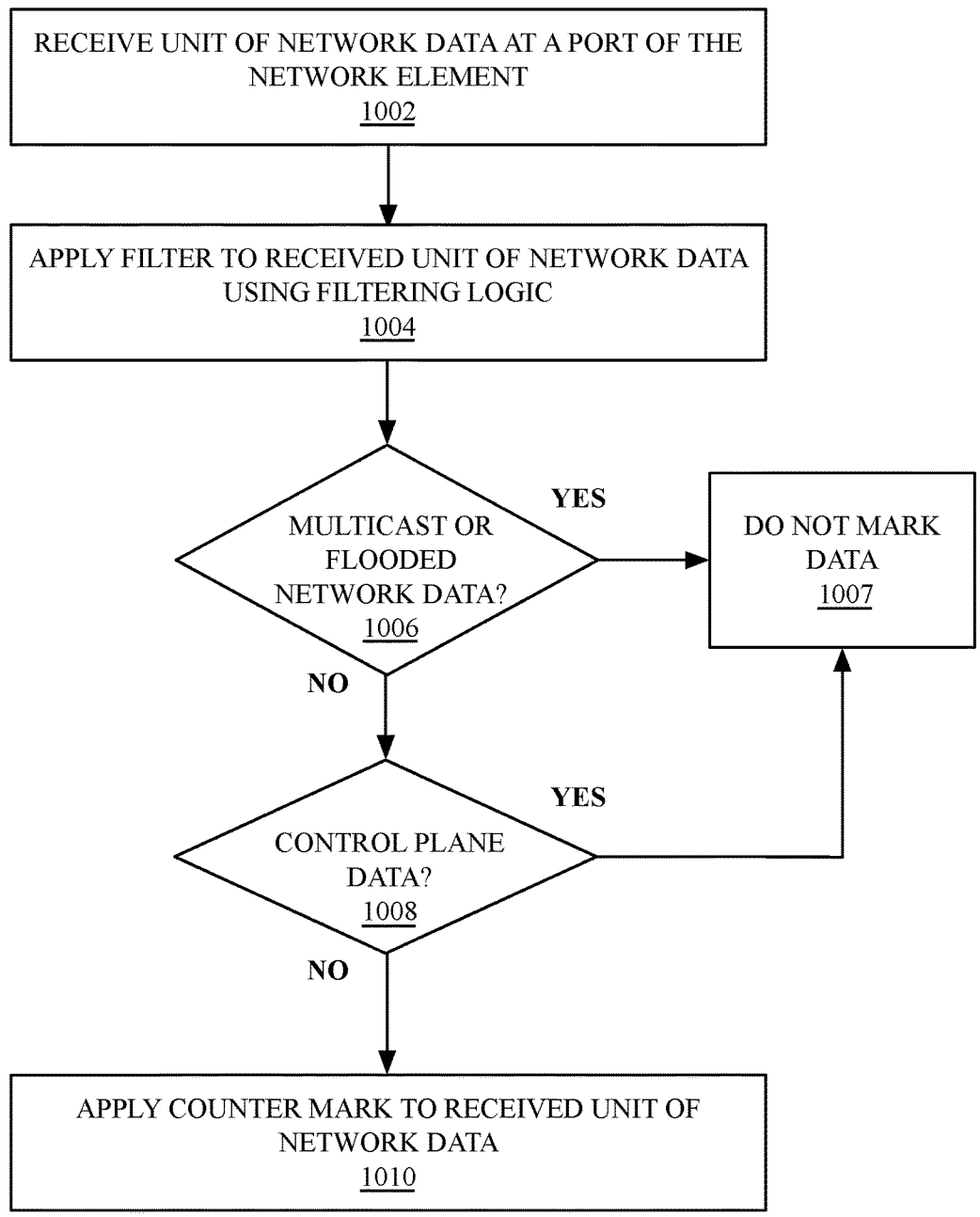
FIG. 10 is a flow diagram of stream tracer marking logic, according to an embodiment.

FIG. 10 is a flow diagram of stream tracer marking logic 1000, according to an embodiment. In one embodiment the illustrated stream tracer marking logic 1000 resides within a component of the ingress data pipeline of a forwarding engine, for example, as shown with respect to the marking logic 822 of FIG. 8. The stream tracer marking logic 1000 can work in conjunction with or include filtering logic, such as the filtering logic 821 of FIG. 8. The filter portion of the stream tracer marking logic 1000 may be, for example, an ACL having a TCAM unit that analyzes each unit of network data through a forwarding pipeline.

In one embodiment, the stream tracer marking logic 1000 performs operations in response to the receipt of a unit of network data at a port of the network element, as shown at block 1002. The marking logic may then apply a filter to the received unit of network data using filtering logic, as shown at block 1004. The filtering logic can perform operations including determining if the unit of network data is multicast or flooded (e.g., layer 2/VLAN flooded) data, as shown at block 1006. If the filtering logic determines that the unit of network data is multicast data or part of a network data flood, the stream tracer marking logic 1000 does not mark the data, as shown at block 1007. In other words, the filtering logic can configure the marking logic to not mark non-unicast data. If at block 1008 the filtering logic determines that the unit of network data is control plane data, for example, data that is destined for a control plane processor and will not be forwarded from the network element, the stream tracer marking logic 1000 does not mark the data, as shown at block 1007. In general the filtering logic within or associated with the stream tracer marking logic 1000 will attempt to filter (e.g., cause not to be marked) any data that the filtering logic determines will be legitimately dropped by the network element, such that the stream tracer marking logic 1000 will mark only data that would be forwarded by a properly configured and/or properly functional network element. After the illustrated or any additional filtering stages or operations are performed the stream tracer marking logic 1000 can apply a counter mark to the received unit of network data, as shown at block 1010. In one embodiment, the counter mark can be arbitrary data or can be data that is otherwise meaningful in some other way. In one embodiment, multiple counter marks can be applied to a unit of network data, for example, to implement temporally overlapping marking as shown in FIG. 7B. For example, in one embodiment the stream tracer marking logic can re-purpose QoS marking logic that is used to classify and mark incoming network data according to traffic class, forwarding priority, drop precedence, or other service related classifications. In the case of traffic class markings, in one embodiment the network element can be configured to re-purpose existing traffic class counters in the data plane logic of the network element to perform at least some of the counting operations in place of or in addition to other steam tracer counting operations.

Figure 11:
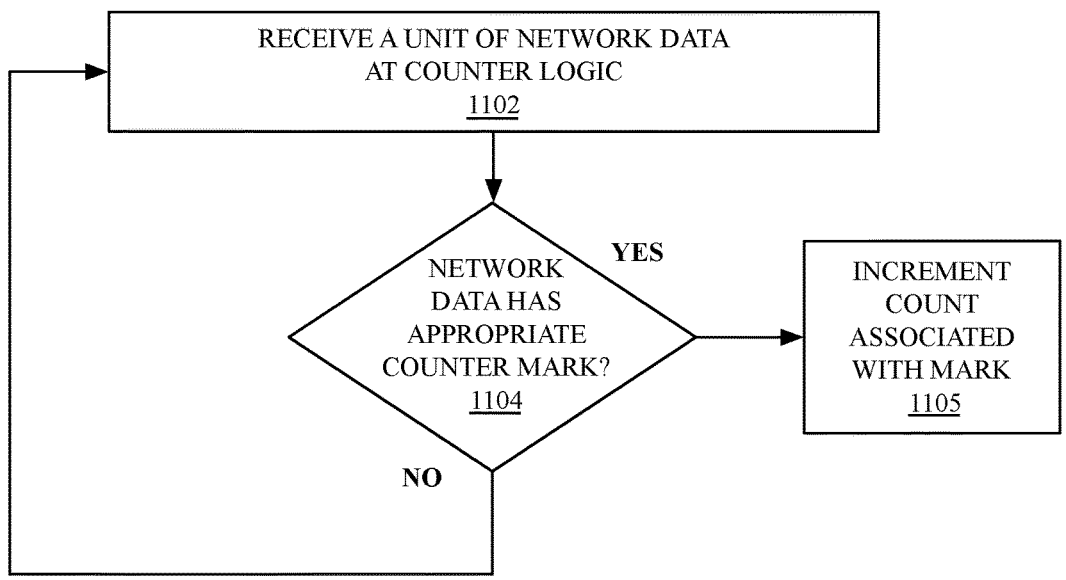
FIG. 11 is a flow diagram of stream tracer counting logic, according to an embodiment.

FIG. 11 is a flow diagram of stream tracer counting logic 1100, according to an embodiment. In one embodiment the stream tracer counting logic 1100 in an ingress data pipeline of a forwarding engine can receive a unit of network data at an ingress counter, as shown at block 1102. The counter can determine if the network data has an appropriate counter mark at block 1104. The appropriate counter mark can be any data mark for which the counter has been configured to increment a specific counter. For example, different counters can be configured to responds to different counter marks, or to respond to all counter marks while incrementing a different counter (e.g., mark 1 counter, mark 2 counter, traffic class counter, etc.). If at block 1104 it is determined that the network data has the appropriate counter mark, the stream tracer counting logic 1100 can increment a count associated with the mark, as shown at block 1105. In one embodiment, the stream tracer counting logic can increment different, independent counters that are associated with different marks. After a marking and quiescent period associated with a mark, the counters associated with the mark can be read and reset. In one embodiment, multiple counters for each mark may be enabled within the ingress and/or egress data pipeline for multiple forwarding engines within the network element.

Figure 12:
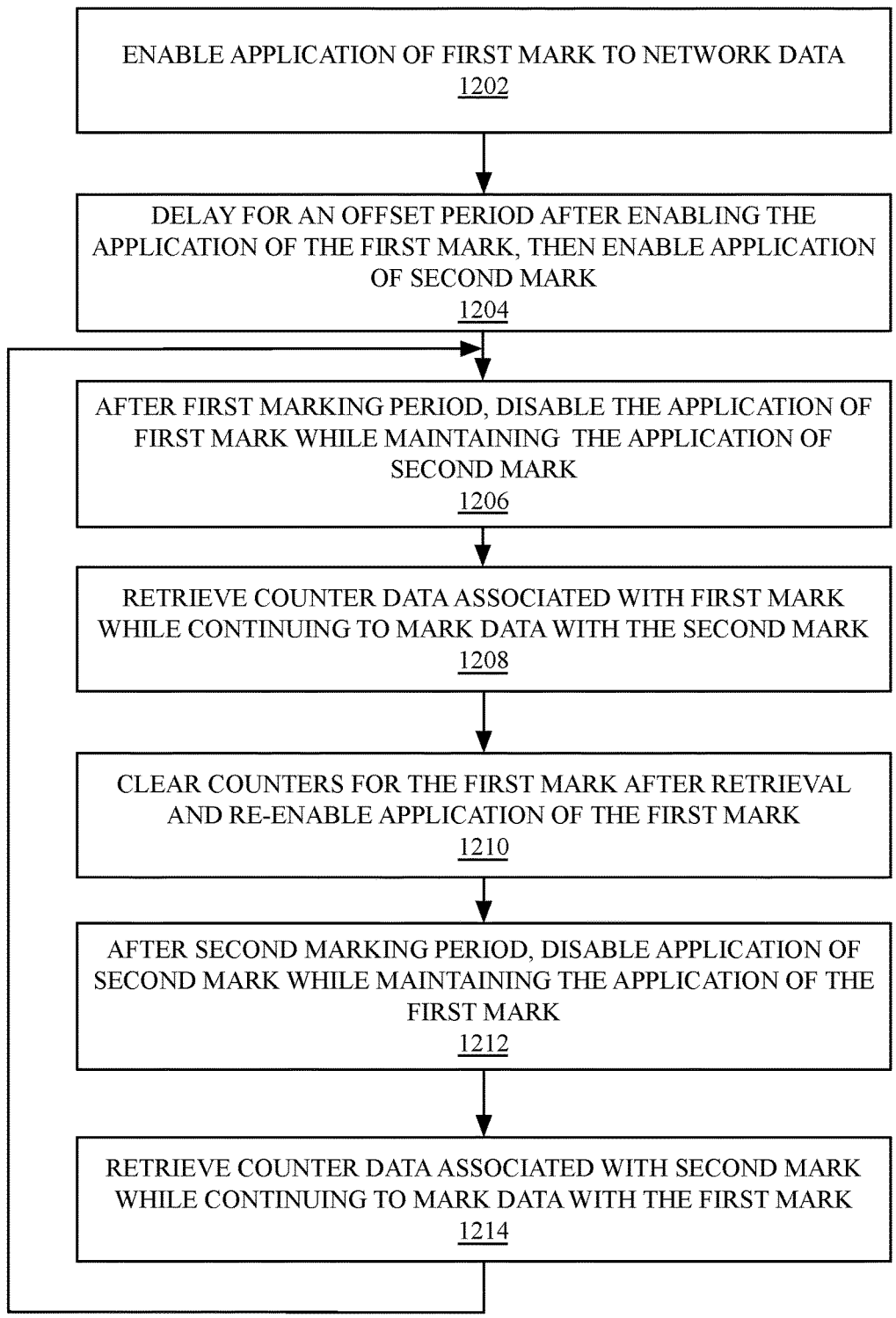
FIG. 12 is a flow diagram of stream tracer overlapping mark logic, according to an embodiment.

FIG. 12 is a flow diagram of stream tracer overlapping mark logic 1200, according to an embodiment. In one embodiment the stream tracer overlapping mark logic 1200 can be used to perform spatially or temporally overlapping stream tracing 700 as shown in FIGS. 7A-B. In one embodiment, the stream tracer overlapping mark logic 1200 uses at least two marks that temporally overlap or define spatially overlapping detection regions. However, any number of marks may be used as appropriate for the intended stream tracing domain.

As shown at block 1202, the stream tracing overlapping mark logic 1200 can perform operations to enable the application of a first mark to network data that traverses one or more components of the network element. In one embodiment the first mark remains enabled for a first marking period. During the first marking period, marking logic (e.g., stream tracer marking logic 1000 as in FIG. 10) can apply the first mark to select units of network data based upon configured marking criteria. After the application of the first mark is enabled at block 1202, the stream tracing overlapping mark logic 1200 can delay for an offset period and then enable application of a second mark, as shown at block 1204. After a first marking period, the stream tracing overlapping mark logic 1200 can then disable the application of the first mark while maintaining the application of the second mark, as shown at block 1206. As shown at block 1208, the stream tracing overlapping mark logic 1200 can retrieve the counter data associated with the first mark while continuing to mark data with the second mark. In one embodiment, retrieving the counter data associated with the first mark at block 1208 occurs after waiting a sufficient quiescent period for data having the first mark to traverse the detection region of the forwarding pipeline.

In one embodiment, the stream tracing overlapping mark logic 1200 can clear the counters for the first mark after the retrieval of the counters for the first mark and re-enable the application of the first mark, as shown at block 1210. After a second marking period, the stream tracing overlapping mark logic 1200 can disable application of the second mark while maintaining the application of the first mark. After disabling the application of the second mark at block 1212, the stream tracer overlapping mark logic 1200 can retrieve counter data associated with the second mark while continuing to mark data with the first mark, as shown at block 1214. In one embodiment, retrieving the counter data associated with the second mark at block 1214 occurs after waiting a sufficient quiescent period for data having the second mark to traverse the detection region of the forwarding pipeline.

Exemplary Data Processing System and Modular Network Element

Figure 13:
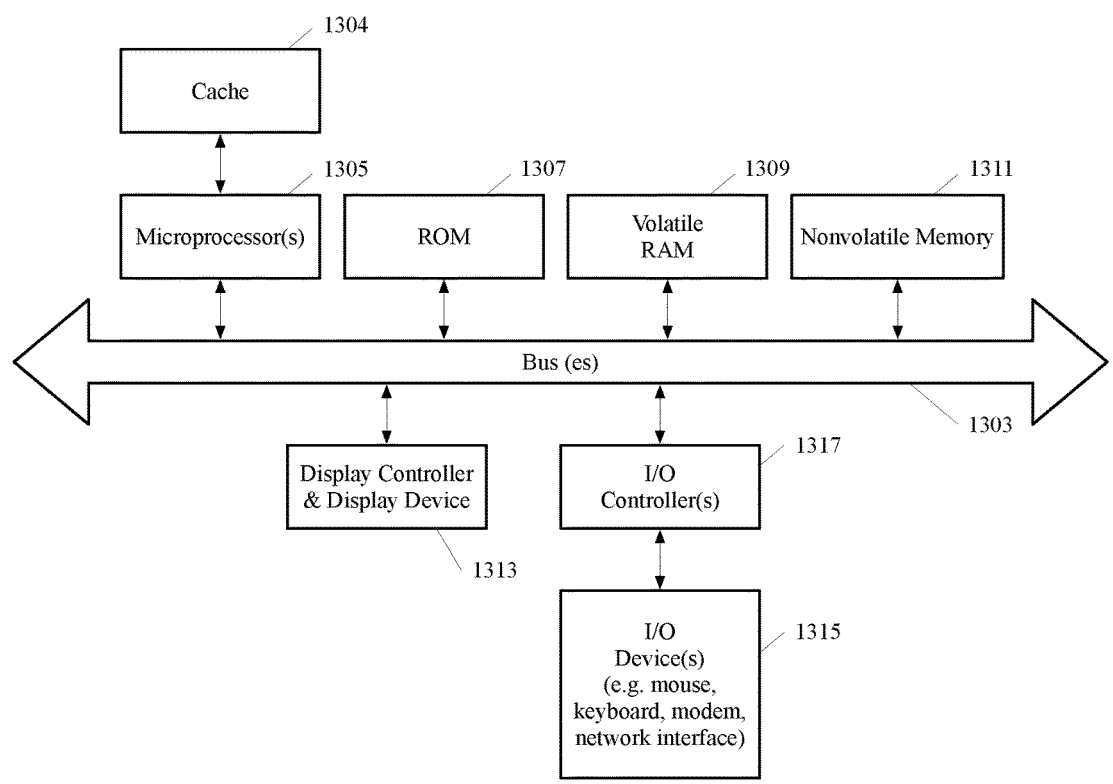
FIG. 13 shows one example of a data processing system, which may be used with one embodiment of the present invention.

FIG. 13 shows one example of a data processing system 1300, which may be used with one embodiment of the present invention. For example, the data processing system 1300 may be implemented within one or more of network element 102 as in FIG. 1, network element 200 as in FIG. 2, or network element 800 as in FIG. 8. In one embodiment, the data processing system 1300 is used within the control plane of a network element described herein. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1300 includes one or more bus(es) 1303 which couple to one or more microprocessor(s) 1305, ROM (Read Only Memory) 1307, volatile RAM 1309 and a non-volatile memory 1311. In one embodiment, the one or more microprocessor(s) 1305 couple to a cache 1304, which can include one or more sets of instruction and/or data caches. The bus(es) 1303 may include one or more buses connected to each other through various bridges, controllers and/or adapters as is well known in the art.

The microprocessor(s) 1305 may retrieve the instructions from the memories 1307, 1309, 1311 and execute the instructions to perform operations described above. Instructions and/or associated data retrieved from the memories 1307, 1309, 1311 may be stored in the cache 1304. The bus(es) 1303 interconnect system components with each other, and to a display controller and display device 1313, and to peripheral devices such as input/output (I/O) devices, which may be mice, keyboards, modems, network interfaces, printers and other devices well known in the art. Typically, the input/output devices 1315 are coupled to the system via input/output controller(s) 1317. The volatile RAM (Random Access Memory) 1309 is typically implemented as dynamic RAM (DRAM), which requires power continually in order to refresh or maintain the data in the memory, but may also include static ram (SRAM), which does not require a periodic refresh.

In one embodiment, the non-volatile memory 1311 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1311 will also be a random access memory although this is not required. While FIG. 13 shows that the non-volatile memory 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 14:
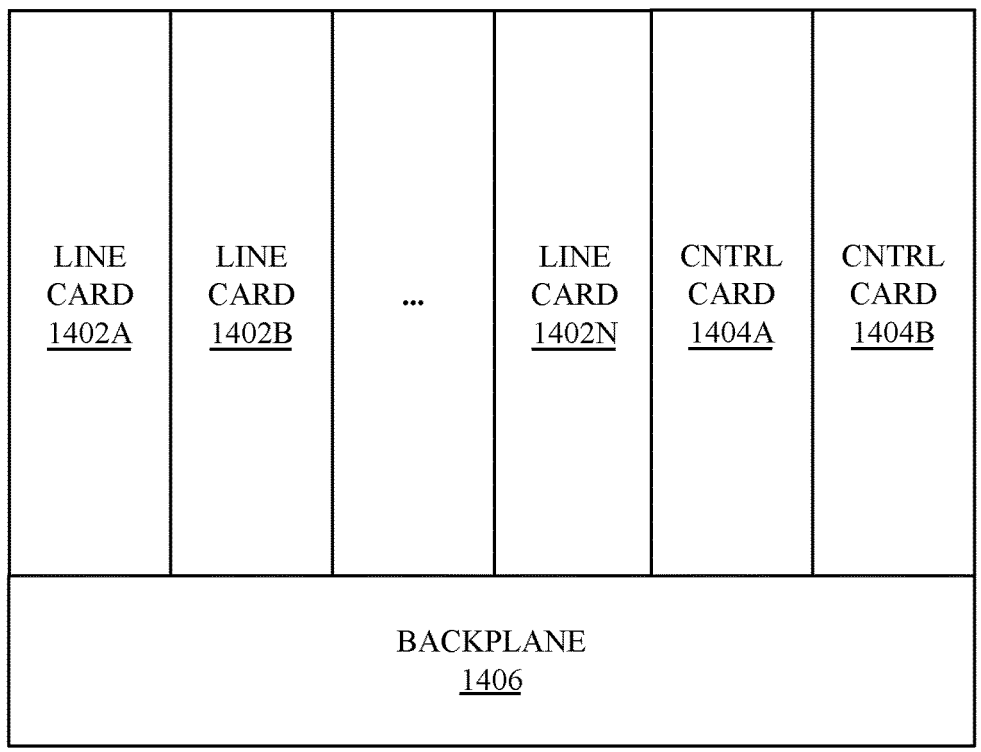
FIG. 14 is a block diagram of an additional embodiment of an exemplary modular network element as described herein.

FIG. 14 is a block diagram of an additional embodiment of an exemplary modular network element 1400 as described herein. In one embodiment, the network element has a modular and expandable configuration that allows the addition or removal of resources configured as line cards 1402A-N, or controller cards 1404A-B coupled to a backplane 1406. In one embodiment, the controller cards 1404A-B control the processing of the traffic by the line cards 1402A-N, which can each include one or more network data forwarding devices such as interfaces 206A-C as in FIG. 2, although the precise nature of the forwarding devices is not limited as such. In addition, the controller card 1404A-B can collect and possibly aggregate timing data as described in FIG. 13 above. In one embodiment, the line cards 1402A-N process and forward traffic according to the network policies received from controller cards the 1404A-B. In one embodiment, one or more of the line cards 1402A-N can monitor and report internal performance data, such as latency data for all or selected units of network data traversing the network element. In one embodiment, the controller cards 1404A-B can also be configured to perform all or a sub-set of functions provided by the line cards 1402A-N. It should be understood that the architecture of the network element 1400 illustrated in FIG. 14 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

To minimize the harmful impact of lost network elements, embodiments described herein provide for a network element having logic to quickly identify when a network element is misforwarding traffic, allowing corrective action can be taken.

Various embodiments of a network element comprising a control plane including stream tracer logic are described herein. In one embodiment the network element additionally includes a data plane coupled to the control plane, where the data plane includes forwarding logic to forward a unit of network data from an ingress interface to an egress interface. The stream tracer logic can be configured to cause marking logic to mark selected units of network data for to be counted by counting logic and to cause the counting logic to count marked units of network data. The stream tracer logic can determine whether units of network data are dropped within the forwarding logic via comparison of an ingress count of the marked units of network data with an egress count of the marked units of network data.

One embodiment provides for a non-transitory machine-readable medium storing instructions which, when executed by one or more processors, cause the one or more processors to perform operations to determining whether network data is dropped within a forwarding pipeline of a network element. In one embodiment the operations comprise causing marking logic to enable marking of network data within the network element, generating a first count of marked units of network data that traverse a first counter within the forwarding pipeline, generating a second count of marked units of network data that traverse a second counter within the forwarding pipeline, causing the marking logic to disable the marking of the network data, retrieving the first and second count of marked units of network data to traverse the first and second counter, and comparing the first and second count to detect dropped units of network data within the network element.

One embodiment provides for a system for tracing network data streams within a network element. In one embodiment the system comprises a first set of network data ports to receive one or more units of network data, a first set of forwarding engines coupled to the first set of network data ports, a switching fabric to couple the first set of forwarding engines with a second set of forwarding engines, the second set of forwarding engines coupled to a second set of network data ports, and stream tracer logic to trace one or more streams of network data through one or more detection regions positioned between the first set of network data ports and the second set of network data ports to determine whether one or more units of network data are dropped within the network element, the stream tracing logic to determine whether the one or more units of network data are dropped via counting logic positioned between at the ingress and egress of each of the one or more detection regions.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network device comprising:
a first processing device to forward a unit of network data from an ingress interface to an egress interface; and
stream tracer logic to cause marking logic to mark selected units of network data for counting via counting logic based on data located within a first unit of network data and cause the counting logic to count the marked units of network data at an ingress point and an egress point of a detection region within the first processing device, the counting logic to generate an ingress count and an egress count for the detection region, wherein the stream tracer logic is to detect whether units of network data are dropped within the detection region based on a count of the marked units of network data and wherein the detection region overlaps with a second detection region in the first processing device.

2. The network device as in claim 1, wherein the ingress count includes a sum of multiple ingress counters.

3. The network device as in claim 2, wherein the egress count includes a sum of multiple egress counters.

4. The network device as in claim 1, wherein the marking logic is included within a data plane of the network element.

5. The network device as in claim 1, wherein the ingress interface includes the marking logic.

6. The network device as in claim 1, wherein the marking logic is configured to apply one or more different counter marks to one or more header regions of the network data, the one or more different counter marks to cause differing sets of counter logic to count the network data.

7. The network device as in claim 1, wherein the marking logic couples with filtering logic, the filtering logic to direct the marking logic to mark unicast network data to be forwarded to an egress interface.

8. The network device as in claim 7, wherein the filtering logic to further cause the marking logic to not mark non-unicast data.

9. The network device as in claim 1, wherein the counting logic includes ingress counting logic to count marked network data upon ingress to the first processing device and an egress counting logic to count marked network data upon egress from the first processing device, the ingress counting logic and egress counting logic implemented in a single logic block.

10. A non-transitory machine-readable medium storing instructions which, when executed by one or more processors, cause the one or more processors to perform operations to determining whether network data is dropped within a forwarding pipeline of a network element, the operations comprising:
- causing the forwarding pipeline to label particular units of network data based on data located within a first unit of network data;
- generating a first count of labeled units of network data that pass a first stage within the forwarding pipeline;
- generating a second count of labeled units of network data that pass a second stage within the forwarding pipeline, wherein the first stage and the second stage are part of a first detection region and wherein the first detection region overlaps with a second detection region;
- causing the forwarding pipeline to stop labeling the particular units of the network data;
- retrieving the first and second count of labeled units of network data to pass the first and second stage; and
- comparing the first count and second count to detect dropped units of network data within the network element.

11. The medium as in claim 10, wherein retrieving the first count of labeled units includes retrieving a count of labeled units from multiple counters within the forwarding pipeline and summing the counts of labeled units from the multiple counters.

12. The medium as in claim 10, wherein retrieving the second count of labeled units includes retrieving a count of labeled units from multiple counters within the forwarding pipeline and summing the counts of labeled units from the multiple counters.

13. The medium as in claim 10, wherein generating the first count of labeled units of network data includes:
- receiving a unit of network data at a first counter;
- determining whether the unit of network data has a label associated with the first counter; and
- based on the determining, incrementing a first count associated with the label.

14. The medium as in claim 13, wherein generating the second count of labeled units of network data includes:
- receiving a unit of network data at a second counter;
- determining whether the unit of network data has a label associated with the second counter; and
- based on the determining, incrementing a second count associated with the label.

15. The medium as in claim 14, further comprising instructions to perform operations to delay for a period of time after causing the forwarding pipeline to disable the labeling of the network data before retrieving the first and second count of labeled units to enable the labeled units to pass the forwarding pipeline of the network element.

16. The medium as in claim 15, wherein the first counter is an ingress counter to a detection region and the second counter is an egress counter to the detection region.

17. A system for tracing network data streams within a network element, the system comprising:
- a first set of network data ports to receive one or more units of network data;
- a first set of forwarding engines coupled to the first set of network data ports;
- a switching fabric to couple the first set of forwarding engines with a second set of forwarding engines, the second set of forwarding engines coupled to a second set of network data ports; and
- stream tracer logic to trace one or more streams of network data through a plurality of detection regions positioned between the first set of network data ports and the second set of network data ports to determine whether one or more units of network data are dropped within the network element based on data located within a first unit of network data, the stream tracing logic to determine whether the one or more units of network data are dropped, the one or more units of network data are determined to be dropped via counting logic to count a number of units of network data passing in or out of each of the plurality of detection regions, wherein at least two of the plurality of detection regions overlap.

18. The system as in claim 17, further comprising marker logic coupled at least to the first set of forwarding engines, the marker logic to mark select units of network data upon ingress of the select units of network data to the forwarding engines.

19. The system as in claim 18, wherein the select units of network data includes unicast network data that are to be forwarded to a single one of the first or second network ports.

20. The system as in claim 18, wherein the marking logic is to apply multiple different marks associated with different detection regions.

21. The system as in claim 18, wherein the marking logic is to apply multiple different marks associated with different marker periods.

22. The system as in claim 17, wherein the stream tracer logic is to position a first detection region between a forwarding engine of the first set of forwarding engines and the switching fabric.

23. The system as in claim 22, wherein the stream tracer logic is to position a second detection region between the switching fabric and a forwarding engine of the second set of forwarding engines.

24. The system as in claim 23, wherein the stream tracer logic is to position a third detection region between ingress and egress of the switching fabric.

25. The system as in claim 24, wherein the stream tracer logic is to position at least two of the first, second, and third detection regions to spatially overlap.

26. The system as in claim 17, wherein the stream tracer logic is to determine whether the one or more units of network data are dropped within the network element via counting logic by causing marker logic to mark units of network data during overlapping marking periods, the stream tracing logic further to:
- enable application of a first mark to network data upon ingress to a detection region, the first mark enabled for a first mark period, the first mark to cause the counting logic to generate a first set of counts of network data having the first mark;
- enable application of a second mark to network data upon ingress to the detection region, the second mark enabled for a second mark period, the second mark to cause the counting logic to generate a second set of counts of network data having the second mark, wherein the second mark period overlaps the first mark period;

retrieve the first set of counts of network data and the second sets of counts of network data from the counting logic; and determine whether the one or more units of network data are dropped within the network element via at least one of the first set of counts or the second set of counts.

27. The system as in claim 26, wherein the stream tracing logic is further to disable application of a first mark while application of the second mark is enabled.

28. The system as in claim 26, wherein the first set of counts of network data includes a first ingress count and a first egress count, wherein the stream tracer logic is to determine one or more units of network data are dropped via a comparison of the first ingress count with the first egress count.

29. The system as in claim 26, wherein the second set of counts of network data includes an second ingress count and an second egress count, wherein the stream tracer logic is to determine that one or more units of network data are dropped via a comparison of the second ingress count with the second egress count.

30. The system as in claim 26, wherein one or more of a first ingress count and a first egress count includes a sum of multiple counts.

31. The system as in claim 26, wherein one or more of a second ingress count and a second egress count includes a sum of multiple counts.

32. A method of determining whether network data is dropped within a forwarding pipeline of a network element, the method comprising:

labeling particular units of network data within the forwarding pipeline based on data located within a first unit of network data;

generating a first count of labeled units of network data that pass a first stage within the forwarding pipeline;

generating a second count of labeled units of network data that pass a second stage within the forwarding pipeline, wherein the first stage and the second stage are part of a first detection region and wherein the first detection region overlaps with a second detection region;

stopping the labeling of the particular units of network data;

retrieving the first and second count of labeled units of network data to pass the first and second stage; and comparing the first count and second count to detect dropped units of network data within the network element.

33. The method as in claim 32, wherein retrieving the first count of labeled units includes retrieving a count of labeled units from multiple counters within the forwarding pipeline and summing the counts of labeled units from the multiple counters.

34. The method as in claim 32, wherein retrieving the second count of labeled units includes retrieving a count of labeled units from multiple counters within the forwarding pipeline and summing the counts of labeled units from the multiple counters.

35. The method as in claim 32, wherein generating the first count of labeled units of network data includes:

receiving a unit of network data at a first counter;

determining whether the unit of network data has a label associated with the first counter; and based on the determining, incrementing a first count associated with the label.

36. The method as in claim 35, wherein generating the second count of labeled units of network data includes:

receiving a unit of network data at a second counter;

determining whether the unit of network data has a label associated with the second counter; and based on the determining, incrementing a second count associated with the label.

37. The method as in claim 36, further comprising instructions to perform operations to delay for a period of time after causing the forwarding pipeline to disable the labeling of the network data before retrieving the first and second count of labeled units to enable the labeled units to pass the forwarding pipeline of the network element.

38. The method as in claim 37, wherein the first counter is an ingress counter to a detection region and the second counter is an egress counter to the detection region.

* * * * *